United States Patent
Johnston et al.

(10) Patent No.: US 10,423,234 B2
(45) Date of Patent: Sep. 24, 2019

(54) FACILITATE USER MANIPULATION OF A VIRTUAL REALITY ENVIRONMENT

(71) Applicant: LucasFilm Entertainment Company Ltd., San Francisco, CA (US)

(72) Inventors: Darby Johnston, Berkeley, CA (US); Ian Wakelin, Berkeley, CA (US)

(73) Assignee: LUCASFILM ENTERTAINMENT COMPANY LTD., San Francisco, CA (US)

(*) Notice: Subject to any disclaimer, the term of this patent is extended or adjusted under 35 U.S.C. 154(b) by 0 days.

(21) Appl. No.: 14/871,558

(22) Filed: Sep. 30, 2015

(65) Prior Publication Data
US 2016/0284136 A1 Sep. 29, 2016

Related U.S. Application Data

(60) Provisional application No. 62/185,422, filed on Jun. 26, 2015, provisional application No. 62/139,490, filed on Mar. 27, 2015.

(51) Int. Cl.
G06F 3/01 (2006.01)
G06T 19/00 (2011.01)
(Continued)

(52) U.S. Cl.
CPC ............ G06F 3/017 (2013.01); G06F 3/011 (2013.01); G06F 3/0482 (2013.01);
(Continued)

(58) Field of Classification Search
None
See application file for complete search history.

(56) References Cited

U.S. PATENT DOCUMENTS 9,443,352 B1* 9/2016 Glover ................. G06T 19/003
2011/0244957 A1* 10/2011 Nishimura ........... A63F 13/573
463/31
(Continued)

OTHER PUBLICATIONS

Yang-Wai Chow, "3D spatial interaction with the Wii remote for head mounted display virtual reality", 2009, University of Wollongong.*
Asier Marzo, Benoit Bossavit, Martin Hachet, "Combining Multi-touch Input and Device Movement for 3D Manipulations in Mobile Augmented Reality Environments", Oct. 5, 2014, ACM.*
(Continued)

Primary Examiner — YuJang Tswei
(74) Attorney, Agent, or Firm — Kilpatrick Townsend & Stockton LLP

(57) ABSTRACT

A system and method facilitating a user to manipulate a virtual reality (VR) environment are disclosed. The user may provide an input via a touch sensitive surface of a computing device associated with the user to bind a virtual object in the VR environment to the computing device. The user may then move and/or rotate the computing device to cause the bound virtual object to move and/or rotate in the VR environment accordingly. In some examples, the bound virtual object may cast a ray into the VR environment. The movement and/or rotation of the virtual object controlled by the computing device in those examples can change the direction of the ray. In some examples, the virtual object may include a virtual camera. In those examples, the user may move and/or rotate the virtual camera in the VR environment by moving and/or rotate the computing device.

20 Claims, 16 Drawing Sheets

(51) Int. Cl.
  *G06F 3/0482* (2013.01)
  *G06F 3/0488* (2013.01)
  *H04N 5/232* (2006.01)
  *H04N 13/344* (2018.01)
  *H04N 13/398* (2018.01)
  *G02B 27/01* (2006.01)
  *G06F 3/041* (2006.01)
  *G06T 19/20* (2011.01)
  *G06F 3/0481* (2013.01)

(52) U.S. Cl.
  CPC ........ *G06F 3/04883* (2013.01); *G06T 19/006* (2013.01); *H04N 5/232* (2013.01); *H04N 5/23216* (2013.01); *H04N 13/344* (2018.05); *H04N 13/398* (2018.05); *G02B 27/01* (2013.01); *G06F 3/041* (2013.01); *G06F 3/04815* (2013.01); *G06T 19/20* (2013.01)

(56) References Cited

U.S. PATENT DOCUMENTS

| | | | | |
|---|---|---|---|---|
| 2013/0038601 | A1* | 2/2013 | Han | G06T 13/40 345/419 |
| 2015/0258432 | A1* | 9/2015 | Stafford | A63F 13/213 463/32 |
| 2016/0025981 | A1* | 1/2016 | Burns | G02B 27/0093 345/156 |

OTHER PUBLICATIONS

Michaël Harboun, Fabien Chancel, and Akki Reddy Challa , The Aeon Project—Augmented Reality for Vehicles, Dec. 26, 2014, Yanko Design.*

Hannes Kaufmann, TU Wien, "Wireless Displays in Educational Augmented Reality Applications", Jun. 2, 2014, ResearchGate (Year: 2014).*

* cited by examiner

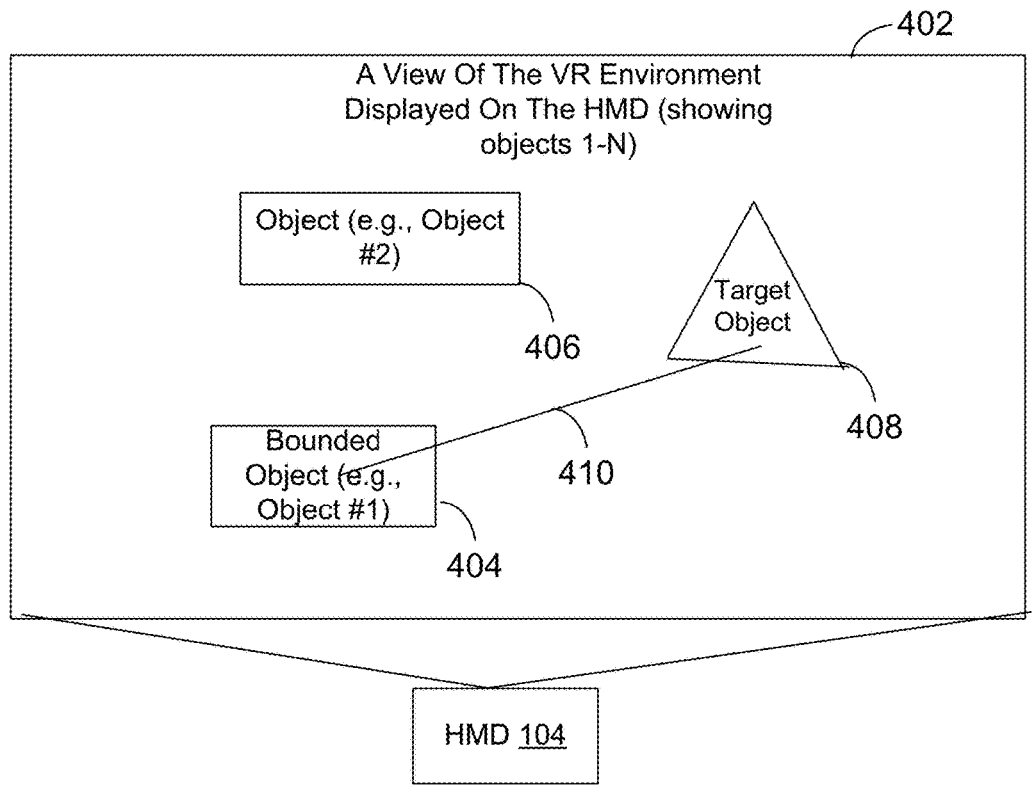
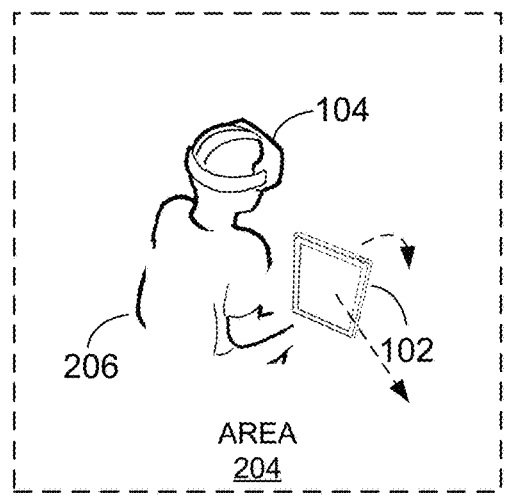
Time: T+1
FIG. 4B

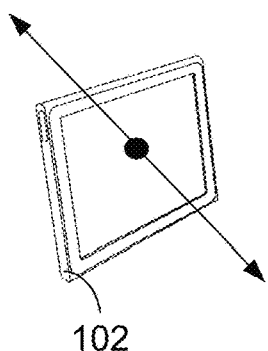
Moving A Virtual Object
Forward or Backward
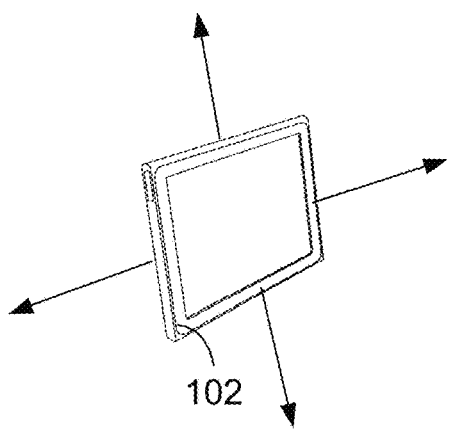
Shifting A Virtual
Object
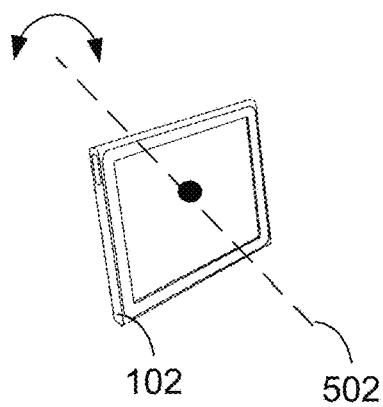
Rotating A Virtual
Object
FIG. 5

Time: T+1

FACILITATE USER MANIPULATION OF A VIRTUAL REALITY ENVIRONMENT

CROSS-REFERENCE TO RELATED APPLICATIONS

This application claims priority to Application No. 62/185,422, entitled "INTERACTING WITHIN AN IMMERSIVE ENVIRONMENT", filed Jun. 26 2015, and to Application No. 62/139,490, entitled "GENERATING CONTENT BASED ON AN IMMERSIVE ENVIRONMENT", filed Mar. 27, 2015, both of which are hereby incorporated by reference, in their entirety.

This application is related to application Ser. No. 14/871,611, filed Sep. 30, 2015, entitled "FACILITATE USER MANIPULATION OF A VIRTUAL REALITY ENVIRONMENT VIEW USING A COMPUTING DEVICE WITH A TOUCH SENSITIVE SURFACE", which is hereby incorporated by reference, in its entirety. This application is related to application Ser. No. 14/724,578, filed May 28, 2015, entitled "SWITCHING MODES OF A MEDIA CONTENT ITEM", and to application Ser. No. 14/724,584, filed May 28, 2015, entitled "NAVIGATING A VR ENVIRONMENT OF A MEDIA CONTENT ITEM", both of which are hereby incorporated by reference, in their entirety.

FIELD

The present disclosure generally relates to facilitating a user to manipulate a virtual reality environment. For example, techniques and systems may be provided to enable a user to manipulate a virtual object in the VR environment.

BACKGROUND

Virtual Reality (VR) systems immerse a user in a three-dimensional virtual world. Typically, the user wears a head-mounted device (HMD) that presents the user views of the three-dimensional world rendered by a computing device associated with the HMD, while blocking all other visual stimulation. The traditional VR systems typically track the user's head or, as the case may be, the user's viewpoint, so that the graphics of the three-dimensional world can be rendered from the user's viewpoint. When the user changes his or her position or moves his or her head, the view of the three-dimensional virtual world displayed on the HMD is changed accordingly. Currently, however, there is no effective way of allowing a user to navigate and move objects within the three-dimensional virtual world.

BRIEF SUMMARY

In one aspect, an embodiment of the present invention is directed to facilitating a user to manipulate a virtual reality (VR) environment displayed on a mobile device, such as a head-mounted display (HMD). The user may be enabled to do so through a computing device associated with the user, wherein the computing device may include a touch sensitive surface capable of receiving touches from the user. The computing device can include a smartphone, a tablet device, a laptop computer, or any other suitable computing device. The computing device may be wirelessly connected to a computing platform, e.g., a server, that renders views of the VR environment displayed on the HMD. User inputs, such as finger gestures, to the touch sensitive surface of the computing device may be received by the computing platform and may be interpreted as a control command or control commands to manipulate the VR environment.

In some examples, the user may be enabled to use the computing device to manipulate a virtual object in the VR environment. For example, the user may tap the touch sensitive surface of the computing device to call up a corresponding menu of items in a view of the VR environment displayed on a HMD associated with the user. The items in the menu may include one or more virtual objects appearing in the view for user selection. The user may select a desired object through the menu via the computing device. After the user selects the desired object, that object may be "bound" to the computing device such that the user may use the computing device to manipulate the virtual object in the VR environment. For example, the user may manipulate (e.g., change the orientation) of that virtual object by changing the orientation of the computing device. As another example, the user may move that virtual object in the VR environment by moving the computing device in the real-world. Compared with traditional virtual reality systems described above, this way of user inputs in the VR systems has improved input accuracy. Unlike the traditional data glove, a computing device with a touch sensitive surface would not require much training on the user part.

In some examples, the virtual object bound to the computing device may cast a ray into the VR environment; and the ray may intersect with ("hit") one or more virtual objects and/or virtual characters ("target") in the VR environment. In those examples, the user may be enabled to change the direction in which the ray is cast into the VR environment by the virtual object by moving the computing device. For example, the user may be enabled to move the position (e.g., shift the virtual object or move the virtual object forward or backward) of the virtual object so that the ray may hit a different target or different targets by moving the computing device in the real-world.

In some examples, ray information regarding intersection of the ray cast by the virtual object, bound to the computing device, and one or more targets may be displayed in a view of the VR environment. For example, such information may include distance information indicating a distance between the virtual object and the target(s), an angle or angles between the virtual object and the target(s), a damage or damages incurred to the target(s) due to the ray hitting the target(s), and/or any other ray information.

In some examples, the virtual object bound to the computing device may include a virtual camera, by which a view of the VR environment can be taken for display. In those examples, the user may be enabled to move the computing device to control a translational movement of the virtual camera within the VR environment. For example, without limitation, the user may be enabled to place the virtual camera in the VR environment by moving the computing device backward and/or forward, shifting the computing device up/down and/or sideways, which can result in the virtual camera moving, and/or shifting accordingly in a first view currently being displayed to the user. In some examples, the user may be enabled to rotate (i.e., change an orientation of) the virtual camera within the VR environment by titling the HMD associated with the user. The user may be enabled to effectuate a second view of the VR environment to be taken at a position within the VR environment where the virtual camera is placed by the user through the translational movement by the computing device and/or through titling the virtual camera by the HMD associated with the user as described above. A field of the second view, a frustum of the second view, an angle of the second view into the VR environment and/or any other aspect of the second view can be based on the placement of the virtual camera in the VR environment in such manner.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

FIGS. 4A-B illustrate an example of using a computing device to control a virtual object in a VR environment.

FIG. 5 illustrates some examples of manipulating a computing device for manipulating a virtual object in a VR environment.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
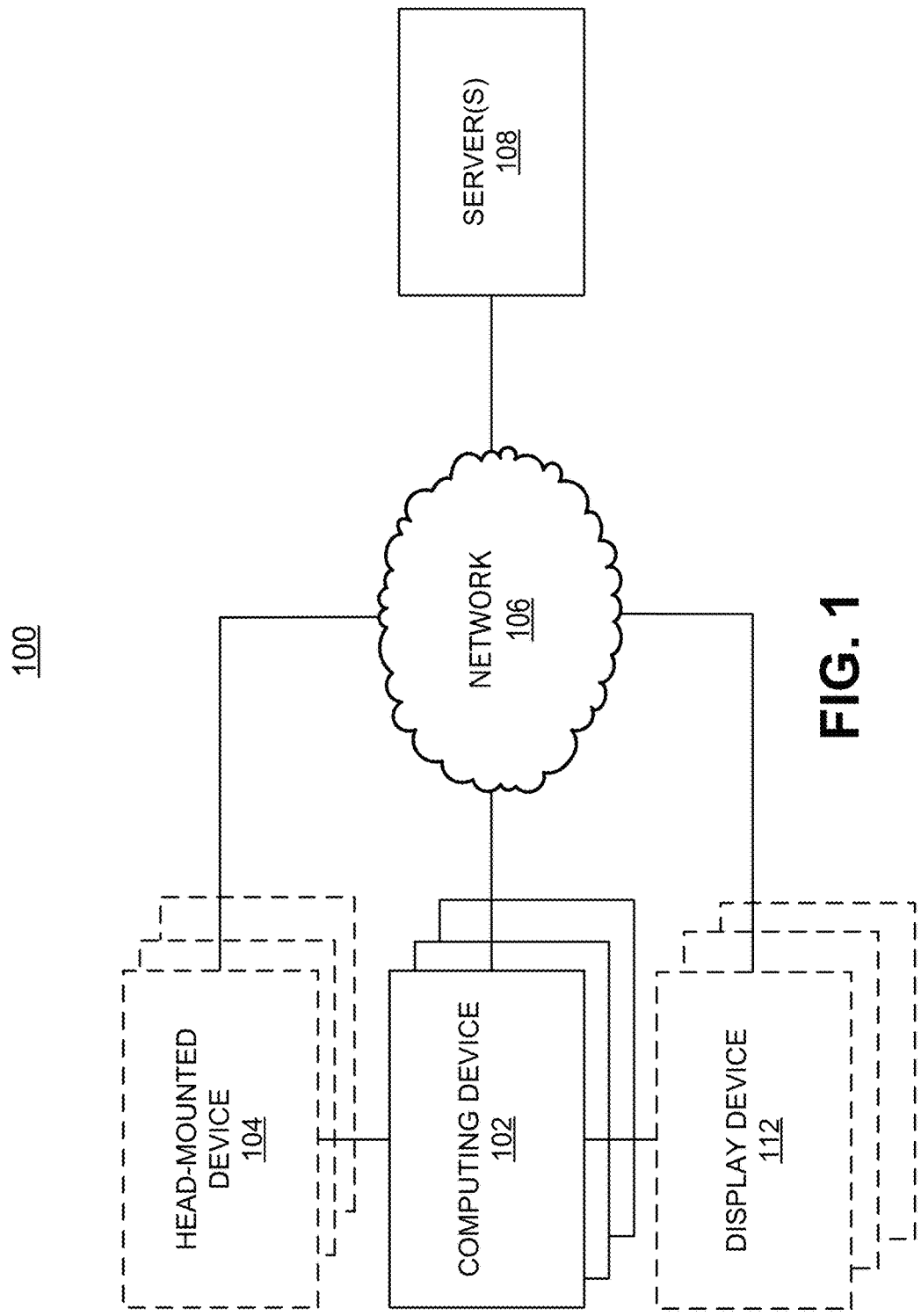
FIG. 1 is a diagram generally illustrating an architecture of a system for facilitating a user to manipulate a VR environment in accordance with the present disclosure.

FIG. 1 illustrates an example of a system 100 that can render a view of a virtual reality (VR) environment for display on a head-mounted device (HMD) associated with a user. As shown, the system 100 may include a server 108 (e.g., one or more server computers) that is configured to provide content to, and/or control one or more interactive devices. The one or more interactive devices may include one or more computing devices 102, one or more head-mounted devices 104, one or more display device 112, or other suitable interactive device(s).

The server 108 can be configured to implemented an instance of the VR environment and to determine view information defining views of the VR environment. The view information determined by the server 108 can be communicated (e.g., via streaming, via object/position data, and/or other information) from server 108 to the interactive devices for presentation to users. The view information determined and transmitted to the interactive devices can correspond to a location in the VR environment (e.g., the location from which the view is taken, the location the view depicts, and/or other locations), a zoom ratio, a dimensionality of objects, a point-of-view, and/or view parameters. One or more of the view parameters may be selectable by the user.

The instance of the VR environment can comprise a simulated space that is accessible by a user via the interactive devices which may present the views of the VR environment to the user. For example, the views of the VR environment can be presented to the user via a display coupled to the interactive devices or may be presented to the user directly on the interactive devices. The simulated space can have a topography, express ongoing real-time interaction by one or more users, and/or include one or more objects positioned within the topography that are capable of locomotion within the topography. The topography can be a 3-dimensional topography. The topography can include dimensions of the space, and/or surface features of a surface or objects that are "native" to the space. In some instances, the topography may describe a surface (e.g., a ground surface) that runs through at least a substantial portion of the space. In some instances, the topography can describe a volume with one or more bodies positioned therein (e.g., a simulation of gravity-deprived space with one or more celestial bodies positioned therein).

The above description of the manner in which views of the VR environment are determined by the server 108 is not intended to be limiting. Server 108 can be configured to express the VR environment in a more limited, or more rich, manner. For example, views determined for the VR environment may be selected from a limited set of graphics depicting an event in a given place within the VR environment. The views can include additional content (e.g., text, audio, pre-stored video content, and/or other content) that describes particulars of the current state of the place, beyond the relatively generic graphics.

The server 108 can communicate the view information with the interactive devices in a client/server architecture via a network 106 as shown. In some embodiments, the network 106 may include one or more cloud infrastructure systems that provide cloud services. A cloud infrastructure system may, for example, be operated by a service provider. In some aspects, services provided by the cloud network may include a host of services that are made available to users of the cloud infrastructure system on demand, such as remote rendering of media content. Services provided by the cloud infrastructure system can dynamically scale to meet the needs of its users. However, this is not intended to be limiting. In some examples, the network 106 may comprise a wired network, a wireless network or a combination of both.

The network 106 can comprise one or more computers, servers, and/or systems, including the server 108. In some embodiments, the computers, servers, and/or systems making up the network 106 are different from a customer's on-premises computers, servers, and/or systems. For example, the network 106 may host an application, and a user or customer may order and use the application via a communication network (e.g., network 106). In some examples, the network 106 may host a Network Address Translation (NAT) Traversal application to establish a secure connection between a service provider of the network and one or more of the interactive devices, such as the computing device 102, head-mounted device 104, or display device 112. A separate secure Transmission Control Protocol (TCP) connection may be established by each interactive device for communicating between each interactive device and the server 108 (or other server) of the cloud network. In some embodiments, each secure connection may be kept open for an indefinite period of time so that the cloud network can initiate communications with each respective interactive device at any time. Various protocols may be used to establish a secure connection between each network device and the server 108, including Session Traversal Utilities for NAT (STUN), Traversal Using Relay NAT (TURN), Interactive Connectivity Establishment (ICE), a combination thereof, or any other appropriate NAT traversal protocol.

In some cases, communications between the network 106 and interactive devices may be supported using other types of communication protocols. Such protocols may include a Hypertext Transfer Protocol (HTTP) protocol, a Hypertext Transfer Protocol Secure (HTTPS) protocol, or other suitable communication protocol. In certain embodiments, the cloud network may include a suite of applications, middleware, and database service offerings that are delivered to a customer in a self-service, subscription-based, elastically scalable, reliable, highly available, and secure manner.

The server 108 can receive a user request for displaying a view of the VR environment, from an interactive device (e.g., computing device 102, head-mounted device 104, or display device 112 shown in FIG. 1), on the interactive device from which the user request originates or on another interactive device. For example, a user input can be received from the computing device 102 for displaying a view of the VR environment on a head-mounted device 104 associated with the user. Upon receiving such a request, the server 108 can provide appropriate view information to the interactive device (or another interactive device) by rendering one or more images representing a view requested by the user and sending the rendered images to the interactive device (or another interactive device). In implementations, the server 108 can include hardware and software for a rendering algorithm to rendering such images. The rendering algorithm can utilize one or more scene files that contain objects in a defined language or data structure. For example, the scene file may include a description of the virtual scene that includes geometries, viewpoints, textures, lighting, and shading information of different VR environments, virtual backgrounds, and virtual objects in the scene. Any suitable rendering algorithm can be used to process the scene file to render the images of the view requested by the user. In some examples, a rendering algorithm may use one or more of rasterization techniques, ray casting techniques, ray tracing techniques, radiosity techniques, or other suitable techniques for rendering an image. In one example, the rendering algorithm used by the server 108 may include rasterization with deferred shading and dynamic global illumination. In some embodiments, the server 108 may include a graphics processing unit (GPU) in addition to a central processing unit (CPU) for rendering the images of the media content item 110.

In some examples, an interactive device can include a computing device 102. The computing device 102 can include a mobile phone, a tablet device, a laptop computer, a television or other display device, a digital video recording device, a set-top box device, or any other suitable computing device 102. The computing device 102 may be associated with a touch sensitive surface capable of sensing touches by a user. The touch sensitive surface associated with the computing device 102 can include a tactile sensor that can translate the motion and position of the user's fingers to a relative position mapped to a display of the computing device 102. Examples of the touch sensitive surface can include a touch sensitive display, a touchpad, or any other touch sensitive surface.

In some examples, an interactive device can include a head-mounted device 104. For example, the head-mounted device 104 may include a head-mounted virtual reality device, such as virtual reality goggles or glasses. In another example, the head-mounted device 104 may include three-dimensional glasses. In some examples, an interactive device may include a display device 112. For example, the display device 112 may include a television, a desktop or laptop computer, an immersion system or cave, or other suitable display device.

In some examples, an interactive device may include a display device 112. For example, the display device 112 may include a television, a projection screen, a LCD/OLED wall, or any other display device. The display device 112 may be used to present one or more views displayed on the HMDs 104 and/or computing devices 102.

Figure 2:
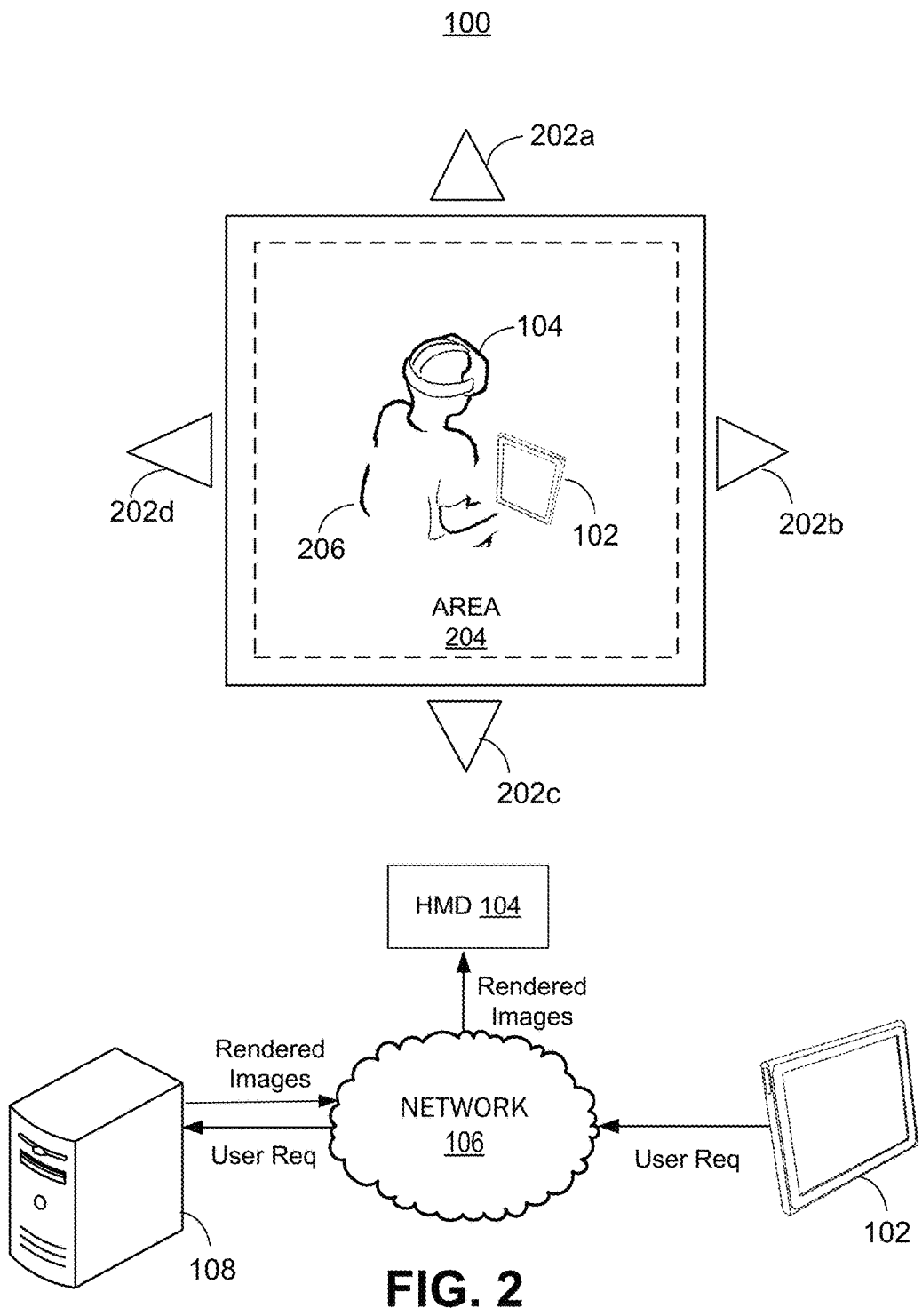
FIG. 2 illustrates an example of the system shown in FIG. 1 in accordance with the present disclosure.

With the general architecture of the system 100 for facilitating a user to manipulate a VR environment having been described, attention is now directed to embodiments of the system 100 with an emphasis on receiving user inputs for such manipulation. FIG. 2 illustrates an example of the system 100 for facilitating a user to manipulate a VR environment. As shown in FIG. 2, the system 100 may include one or more sensors 202, such as sensors 202-b shown, located in the area 204. The sensors 202 may include, for example, cameras, depth sensors, infra-red sensors, light sensors, or other suitable sensors. The sensors 202 may be used to track the movement and positioning of a user 206 within the area 204. As shown, the user 206 may wear a HMD 104 and control the computing device 102 at the same time. However, this is not intended to be limiting. It should be understood the user 206 is not required to wear HMD 104 to manipulate a view of the VR environment for display via the computing device 102. In some other examples, the user 206 may use the computing device 102 to manipulate a view of the VR environment displayed on another user's HMD 104.

The sensors 202 can track the movement and orientation of the computing device 102 with in the area 204. For example, the computing device 102 can be equipped with a signal (e.g., radio) transceiver configured to communicate with sensors. The signals transmitted by the transceiver can be used to indicate position information indicating a position of the computing device 102 within the area 204. The signals can be used to indicate orientation information indicating an orientation of the computing device 102 with respect to one or more reference points. The position information can be transmitted by the sensors 202 to the server 108 for processing such that the movement of computing device 102 within the area 204 can be determined by server 108. The orientation information can be transmitted by the sensors 202 to the server 108 for processing such that an orientation change of the computing device 102 (e.g., rotating about an axis) can be determined by the server 108.

In some implementations, the computing device 102 can be configured to communicate its position information and/or orientation information to the server 108, with or without the aid of the sensors 206. For example, orientation information acquired by a gyroscope of the computing device 102 can be transmitted to the server 108 for the processing, position (and/or speed information) acquired by an accelerometer of the computing device 102 can be transmitted to server 108, and/or any other position or orientation related information can be acquired by any other components of the computing device 102 and can be transmitted to the server 108. In some examples, the communication of such information from the computing device 102 to the server 108 can be achieved via a wireless, a wired network or a combination thereof.

In some examples, the system 100 may establish a communication link with one or more interactive devices, such as the computing device 102 shown, in proximity to the system 100. For example, the system 100 may establish a Bluetooth™ link, a Zigbee™ link, or other communication link with the computing device 102 located within the area 204. Following establishment of the communication link, the system 100 may receive a request from the user 206. The user request may include a request to manipulate one or more virtual objects and/or virtual characters within the VR environment, a request for displaying a view of the VR environment, a request to augment a current view of the VR environment being displayed on a HMD 104 associated with the user, and/or any other user requests.

Upon receiving the user request from the computing device 102, the server 108 may render one or more images representing a view of the VR. In the examples where the received user request involves manipulation of one or more virtual objects and/or virtual characters within the view, the rendered images can reflect a result or results of the manipulation in the view. The server 108 can then send the rendered images to the interactive devices for presentation. In some embodiments, the computing device 102 can provide height information for the user 206. Using the height information, the server 108 can adjust the height of assets or objects rendered for in the particular view. For example, if a particular user were 6'5, the server 108 can adjust a particular character in the particular view to also be 6'5. In one aspect, assets may be downloaded from the interactive device, from local storage of the system, or from a repository available over the Internet.

The system 100 may be used in several different applications. For example, without limitation, a director may use the may immersive experience provided by the system 100 to prepare for an animation feature from the VR environment implemented by the server 108. For example, the director may use the computing device 102 to provide inputs the set dress one or more scenes to be used in the animation feature, to set placement of one or more virtual cameras for the animation features, to make notes about certain objects, characters, locations, or any other aspects about the VR environment, or for any other purpose. As another example, an actor may use the immersive experience provided by the system 100 to aid in his or her acting performance (e.g., maintain eye level with a digital character). As yet another example, a video game user may control a 3D holographic character within an immersive environment and interact with other assets in the immersive environment.

Figure 3:
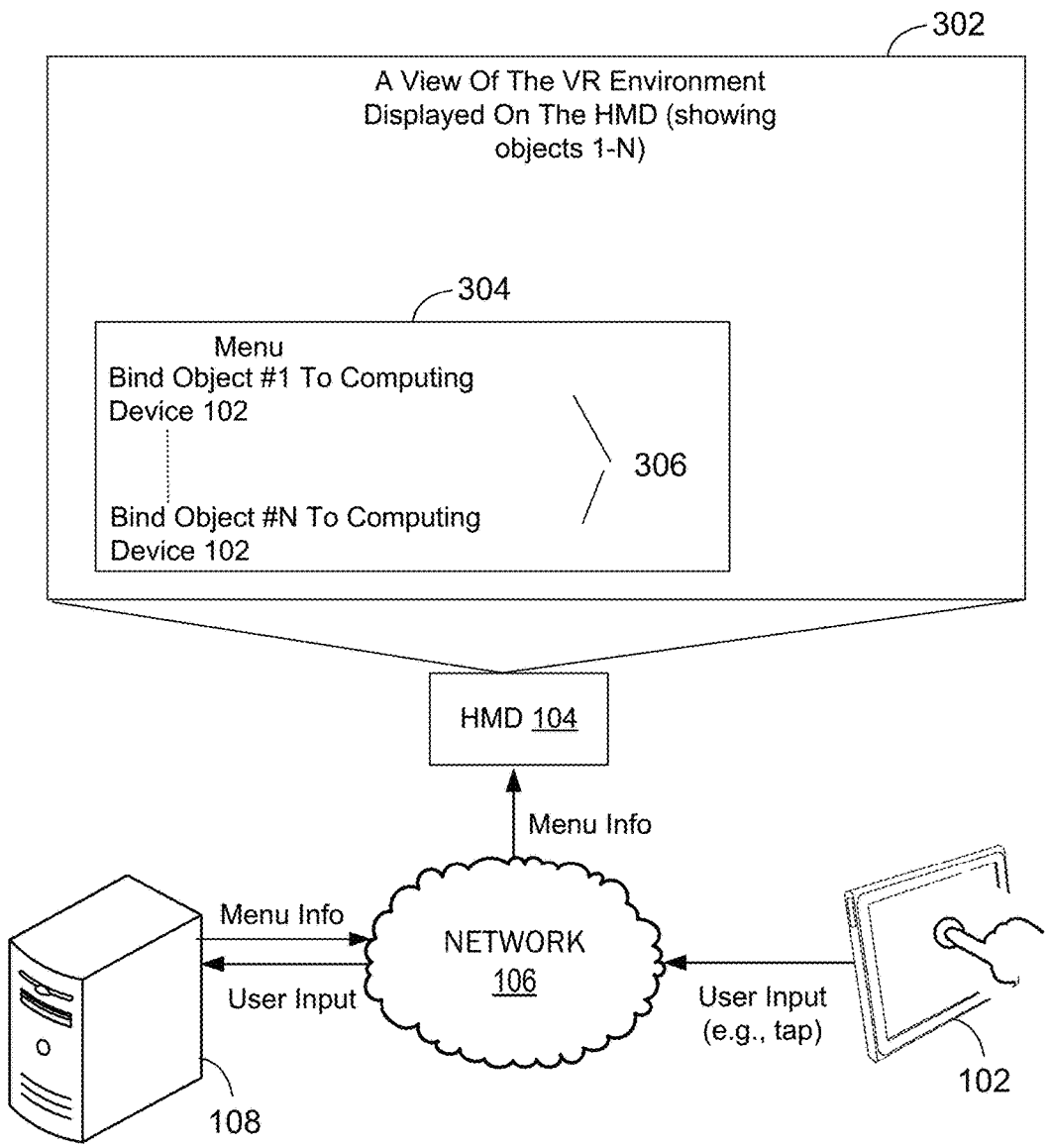
FIG. 3 illustrates another example of system shown in FIG. 1.

FIG. 3 illustrates another example of system 100. As shown in this example, a menu 304 for user to select one or more objects for manipulation may be presented in the view 302 currently being display on the HMD 104 associated with the user. As shown, the user may be enabled to provide an input to the computing device 102 via the touch sensitive surface associated with the computing device 102. For example, as shown in this example, the user may tap the touch sensitive surface of the computing device 102 to provide such a input. As shown, the input provided by the user can be transmitted to the server 108 via the network 106. In some examples, as in this example, the user request can include a request to present a menu of selectable items, such as the menu 304 shown, in the view 302. The server 108 can be configured to translate such a user input and map the user input to a control command that specifies a selectable menu of items for presentation in the view currently being displayed on the HMD 104.

As shown, once receiving a user input requesting the menu 304 to be shown in the view, the server 108 can be configured to determined menu information for presenting the menu 304 on the HMD 104. The menu information determined by the server 108 can include information regarding one or more virtual objects, virtual characters, terrain(s), and/or any other entity appearing in the view. For example, as illustration, without limitation, the server 108 can determine, based on the location where the view 302 is taken, that one or more objects appear in the frustum of the view 302 can be included in the menu 304. In that example, the server 108 can generate one or more selectable items in the menu 304 corresponding to each of those objects.

In this example, as shown, the selectable items 306 generated by the server 108 are options for the user to "bind" the computing device 102 to the one or more objects appearing in the view 302. That is, once the user selects one of the selectable items 306, a virtual object corresponding to the selected item in the menu can be manipulated by the user using the computing device 102 in the manner described and illustrated herein. For example, as illustration, without limitation, the user may select to manipulate object #1 using the computing device 102 via the menu 304.

It should be understood the example given in FIG. 3 for a user to select a virtual object to be bound to the computing device 102 associated with the user is merely illustrative and thus is not intended to be limiting. Other examples of enabling a user to bind a virtual object to the computing device 102 associated with the user are contemplated. For example, without limitation, an association between an virtual object and a user input may be predetermined and stored in the server 108 for such binding. For instance, the virtual object can be a virtual camera, and the user input can be a double tap on the touch sensitive surface associated with the computing device 102. In that instance, the user can double tap the touch sensitive surface to bind the virtual camera to the computing device 102 such that the user can subsequently manipulate the virtual camera using the computing device in a manner consistent with those described and illustrated herein. As another example, without limitation, the user input can activate a binding mode such that once the user input is received by the server 108, one or more virtual objects, virtual characters, terrains, and/or any other entities in the frustum of the view 302 can be selected by the user for such binding.

Referring back to FIG. 3, once various aspects regarding the presentation of the menu having been determined by the server 108, menu information regarding generating the menu in accordance with the determined aspects (menu information as illustrated in FIG. 3) may be transmitted to the HMD 104. Once receiving the menu information from the server 108, the HMD 104 may generate the menu 304, accordingly and present it in the view 302. In some examples, the menu 304 may be presented in the view 302 transparently or semi-transparently; and in some other examples, the menu 304 may be presented in the view 302 as an opaque area such that a portion of the view 302 is blocked by menu 304.

Figure 4A:
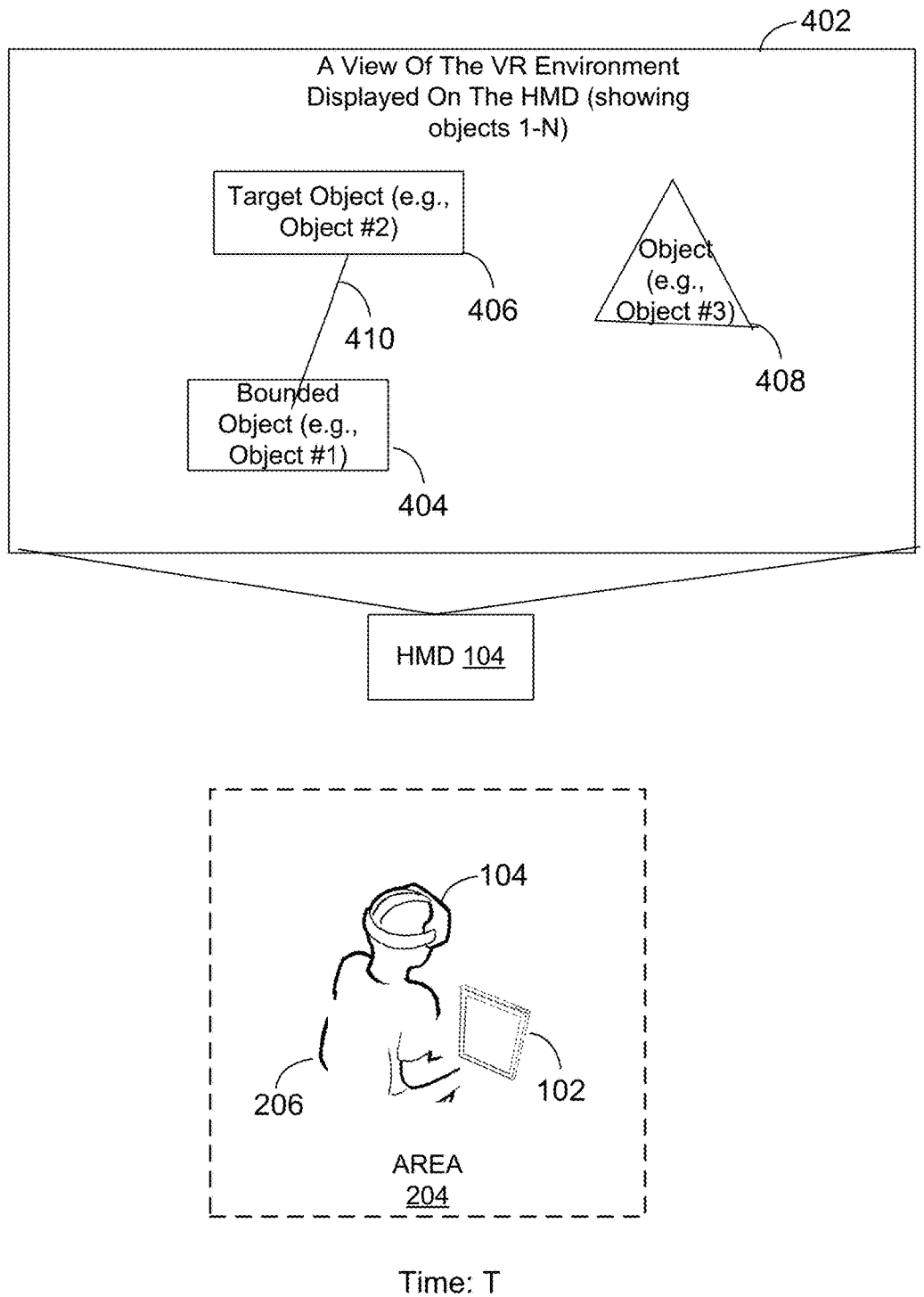

FIGS. 4A-B illustrate an example of using a computing device 102 to control a virtual object in a VR environment. As shown, after the user binds a virtual object, virtual object 404 shown, to the computing device 102 as illustrated in FIG. 3, the user 206 is enabled to manipulate the virtual object 404 in the view 402 using the computing device 102. In some examples, as in this example, the virtual object bound to the computing device 102 may cast a ray, such as the ray 410 shown, into the VR environment. As shown, the ray 410 may intersect ("hit") one or more virtual objects in a direction from the position the ray 410 is cast by the virtual object 404. In this example, at time T, as shown in FIG. 4A, the ray 410 hits a target object 406 in the VR environment.

As shown in FIG. 4B, The user 206 is enabled to manipulate the direction of the ray cast by the object 404 by manipulating the computing device 102 within the area 204. For example, as shown, the user 206 may tilt and/or shift the computing device 102 within the area 204 to manipulate the ray casting by the virtual object 404. In this example, as a result of the user manipulation of the computing device 102 within the area 204, ray 410 is cast, from the object 404, to hit another virtual object 408 in the view 402 at time T+1.

FIG. 5 illustrates some examples of manipulating a computing device 102 for manipulating a virtual object in a VR environment. As shown, in some examples, the computing device 102 may be moved forward or backward by the user 206 within the area 204. As described above, such translational movement of the computing device 102 can be captured by the server 108 via the sensors 206 and/or via the position and/or orientation information provided by the computing device 102 itself. Base on the translational movement of computing device of 102, the server can be configured to determine a displacement of the virtual object 404 bound to the computing device 102 and applied that displacement to the view 402 such that the virtual object 404 moves in the view 402 in accordance with the translational movement of computing device 102.

As another example, FIG. 5 also shows that the computing device 102 can be shift by the user 206 sideways and/or up and down. In the examples where the virtual object 404 casts a ray 410 into the VR environment, such translational movement of the virtual object 404 can result in the ray 410 being cast in a different direction into the VR environment and hit a different target object or different target objects.

Still shown in FIG. 5 is that the computing device 102 can be rotated in any degree about an axis 502 through the computing device 102. This can enable the user to tilt the virtual object 404 in the VR environment. In the examples where the virtual object 404 casts a ray 410 into the VR environment, such rotational movement of the virtual object 404 can result in the ray 410 being cast in a different direction into the VR environment and hit a different target object or different target objects.

It should be understood the examples of manipulating the computing device 102 for manipulating the virtual object 404 in the VR environment are merely illustrative and thus not intended to be limiting. Other examples of manipulating computing device 102 are contemplated and one skilled in the art will appreciate the computing device 102 can be manipulated in other ways for manipulating the virtual object 404 in accordance with the teachings of the present disclosure.

Figure 6:
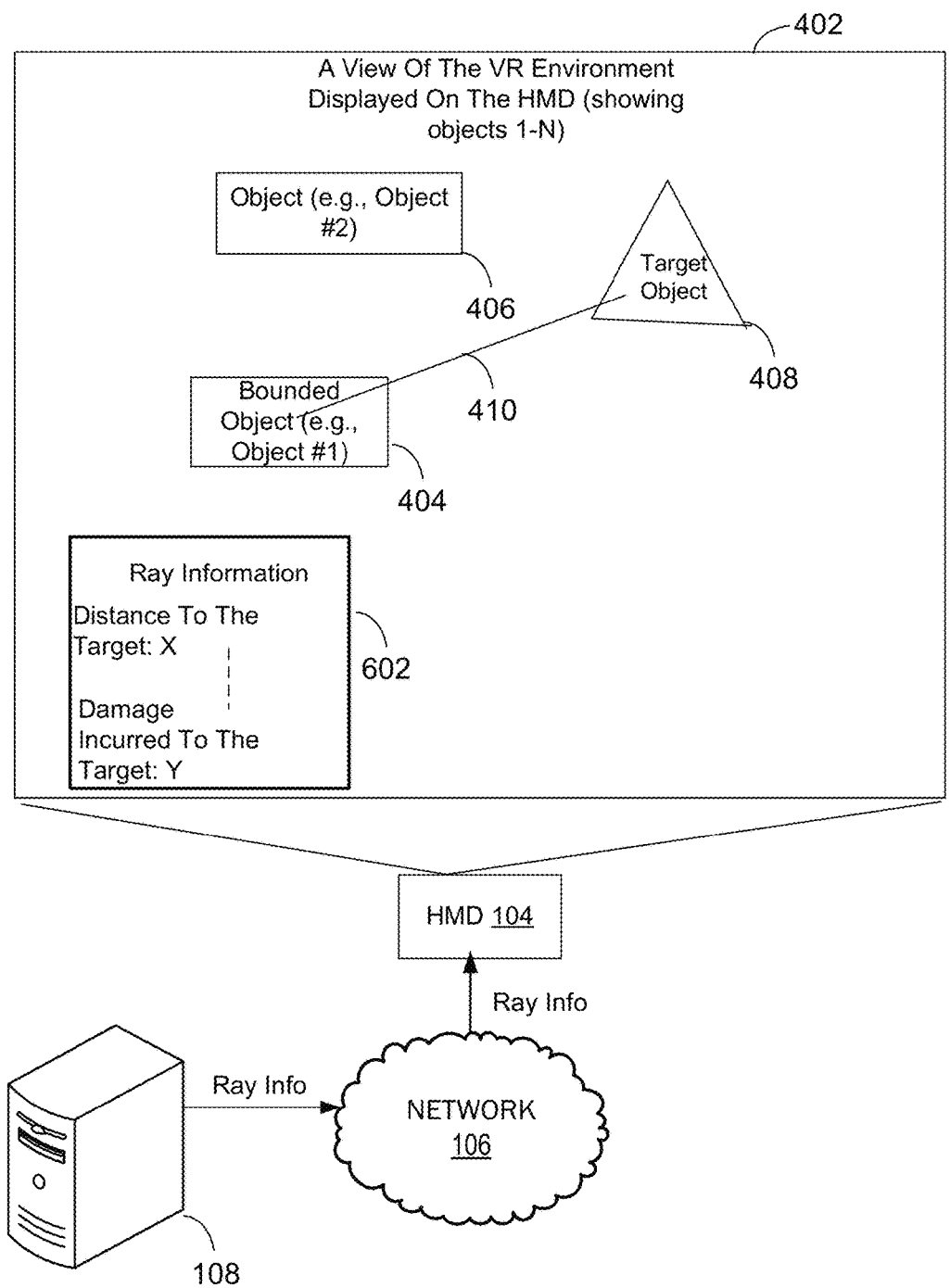
FIG. 6 illustrates exemplary ray information that can be displayed.

In some examples, ray information regarding a ray cast by a virtual object bound to a computing device 102 may be presented in a view of the VR environment. FIG. 6 illustrates exemplary ray information that may be presented. As shown, as the ray 410 intersect (hit) the target object 408, the server 108 can determine ray information regarding various aspects about such an intersection. For example, the server 108 can determine a distance between the virtual object 404 that casts the ray 410, a damage incurred by the ray 410 to the target object 408, an angle between the ray 410 and the target object 408, and/or any other aspects about the intersection between the ray 410 and the target object 408. As shown, the ray information 408 can be transmitted to a HMD 104 associated with the user for presentation in the view 402.

The exemplary ray information illustrated in FIG. 6 can be useful in a number of situations. For example, in one situation, the virtual object 404 can include a virtual camera of interest to a director of an animation feature. In that situation, the director is enabled to use the computing device 102 to cast the ray 410 from the virtual camera 404 to hit different target(s) in the view 402. The ray information 602 presented in the view 402 as illustrated in FIG. 6 can be helpful to the director to determine how far the target(s) is from the virtual camera 404, the angle between the virtual camera 404 and the target(s), and/or any other aspects regarding the target(s) with respect to the virtual camera 404. Such ray information 602 can be used to assist the director to determine how the target object(s) will be captured by the virtual camera 404, and thus to make an appropriate decision about a placement the virtual camera 404 in the VR environment. As another example, the virtual object 404 can include a virtual pointing device such that the user 206 can use the computing device to manipulate the virtual pointing device 404 to point to different virtual objects in the view 402. This can be helpful when the user 206 is showing the VR environment through the view 402 to another or other users also viewing the VR environment through the view 402 via, for example, HMDs 104 associated with those users. Still as another example, the ray information can be helpful for the user 206 to engage a game within the VR environment. For example, without limitation, the virtual object 404 can include a virtual weapon such that the user 206 can manipulate the virtual weapon 404 through the computing device 102 to "shoot" the ray at different target(s) within the VR environment. The damage information as shown in FIG. 6 can be useful for the user to assess whether the current ray casting by the virtual weapon is effective.

Returning to FIG. 2, in some examples, user 206 may manipulate the computing device 102 to move a virtual camera around the VR environment. In one aspect, the virtual camera may be controlled by using one or more gestures input directly to a touchscreen of the computing device 102. For example, the user may input a swipe gesture with a single finger to pan or tilt the virtual camera according to the direction of the swipe. The user may furthermore input a swipe gesture with two fingers to move the camera according to the direction of the swipe. The user may moreover input a pinch gesture to "dolly" the virtual camera. In another aspect, the virtual camera may be controlled by physically changing the position of the computing device 102 and/or changing the orientation of the computing device 102. For example, a user can move forward 2 feet from his or her current location while holding the computing device 102. The computing device 102 may detect such movement based one or more sensors of the computing device 102 (e.g., an accelerometer, gyroscope, GPS, depth sensor, camera, wireless radio, etc.). The information regarding the detected movement may be transmitted to the server 108 which may in response shift the virtual camera and transmit image frames to the computing device 102 with the virtual camera having moved forward 2 virtual feet in the VR environment.

Figure 11A:
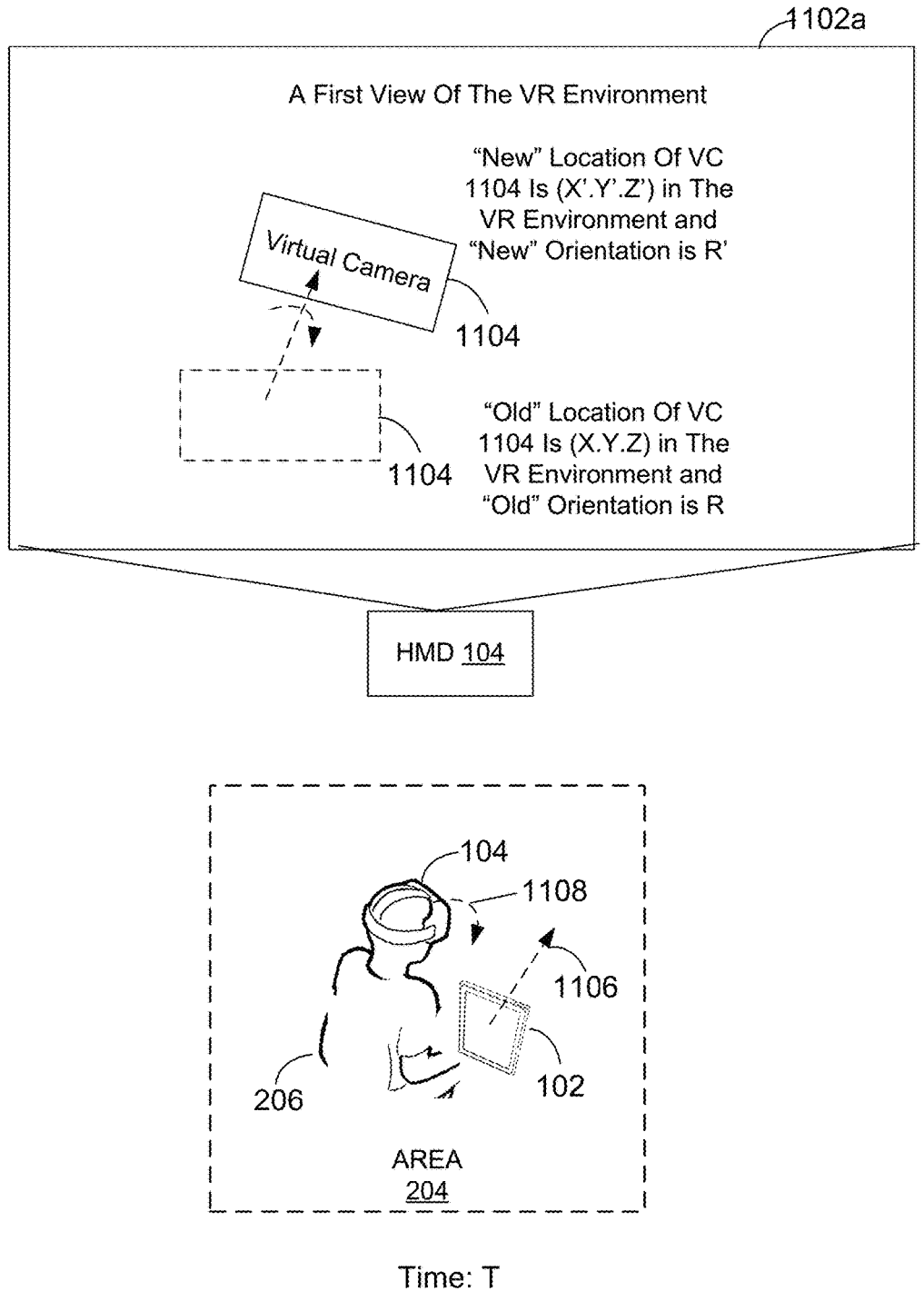
FIGS. 11A-B illustrate an example of using a computing device to control a virtual camera in a VR environment for taking a view of a VR environment for display.
Figure 11B:
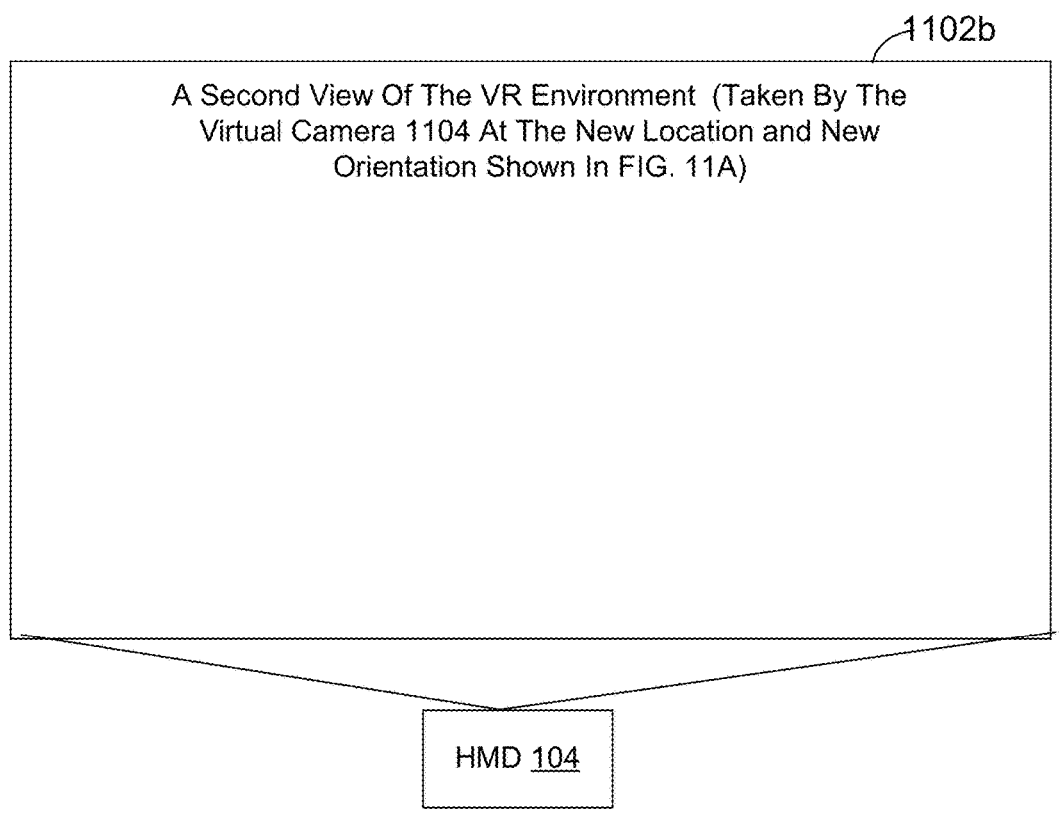

FIGS. 11A-B illustrate an example of using the computing device 102 to control a virtual camera 1104 in a VR environment for taking a view of a VR environment for display. As illustrated by FIGS. 11A-B, in some examples, the virtual object bound to the computing device can include a virtual camera such as the virtual camera 1104. In those examples, the virtual camera 1104 can be used to take a view of the VR environment for display on the interactive devices shown in FIG. 1. The user can be enabled to move the computing device 102 to control the location and/or orientation of the virtual camera 1104 within the VR environment. For example, without limitation, the user may be enabled to place the virtual camera 104 in the VR environment by moving the computing device 102 backward and/or forward, shifting the computing device 102 up/down and/or sideways, which can result in the virtual camera 104 moving in translational directions accordingly in a first view currently being displayed to the user. As another example, without limitation, the user may be enabled to rotate (change the orientation of) the virtual camera 104 in the VR environment by tilting the HMD 104 associated with the user, which can result in the virtual camera 104 rotating accordingly in the first view.

As shown in this example, at time T, user 206 moves the computing device 102 forward as indicated by arrow 1106. As shown, the user 206 may be enabled to move the virtual camera 104 in translational directions (e.g., forward, backward, and/or sideways) using the computing device 102, which is bound to the virtual camera 104. As also shown, in this example, the user 206 may be enabled to rotate the virtual camera 104 by titling his/her neck to tilt the HMD 104 as indicated by arrow 1108. Such movement displacements by the computing device 102 (e.g., in the translational directions) and/or the rotational displacements by the HMD 104 may be received by the server 108. Based on such displacements, the server 108 can determine corresponding movement (translational and/or rotational) by the virtual camera 104 in the VR environment. In this example, as a result of the user 206 moving the computing device 102 and tilting the HMD 104 as shown, the virtual camera 1104 is moved, in a first view 1102a of the VR environment, from an "old" location at (X,Y,Z) in the VR environment to a "new" location at (X',Y',Z') in the VR environment, and is changed from an "old" orientation R to a "new" orientation R'. The user 206 may be enabled to effectuate a second view 1102b of the VR environment, shown in FIG. 11B, to be taken at the "new" location where the virtual camera 1104 is placed as shown in FIG. 11A. A field of the second view, a frustum of the second view, an angle of the second view into the VR environment and/or any other aspect of the second view can be based on the new location, the new orientation, and/or any other aspects about the placement of the virtual camera 1104 as illustrated in FIG. 11A.

In some examples, an interface can be displayed on the computing device 102. In those examples, the user interface displayed on the computing device 102 may include indicators (e.g. text, icons or buttons) regarding various settings for a virtual camera 1104 configured to take views of the VR environment. For example, the user interface may display the current height, location, and orientation of the virtual camera 1104. The user interface may also display information regarding the focus, crop-factor/aspect ratio, f-stop, and/or lens type of the virtual camera 1104. In some embodiments, the user may interact with the indicators and/or the computing device 102 in order to change various settings associated with the virtual camera 1104. For example, the indicators may enable the user to change the focus, crop-factor, f-stop, and/or lens type of the virtual camera 1104. Illustratively, user 206 may select an icon to change the lens of the virtual camera 1104 from 50 mm to 120 mm. As such, the image frames displayed to the user may exhibit the features of a 120 mm lens, including any lens distortion effects, zoom, etc. As another example, the user may select a focus indicator. Upon selecting the focus indicator, the user may select various objects or parts of the VR environment by contacting his or her finger to the location of the object or part as displayed on the screen of the computing device 102. The position information for the user's finger may be transmitted by the computing device 102 to the server 108. The server 108, in turn, may generate or "shoot" one or more virtual, invisible rays from the current position of the virtual camera 1104 into the VR environment based on the position information. Upon detecting an intersection of the one or more rays with a virtual object or part of the VR environment, the server 108 can determine that the intersecting object and/or part should be placed in focus. Accordingly, the VR environment is rendered with the object/part placed in focus. Furthermore, depending on the virtual distance of other objects in the VR environment relative to the in-focus object (and the selected lens type/f-stop), the server 108 applies varying degrees of focus to the other objects. For example, an object far away from the selected in-focus object in the VR environment may be rendered with a slight blur. In some instances, the amount of blur applied to an object may increase as the object is further away from the in-focus object in the VR environment.

The user 206 may interact with the displayed indicators in any suitable manner in order to perform a change to the settings of the virtual camera 1104. In some embodiments, the user 206 may first select the indicator associated with the setting to be changed by tapping on the indicator. Thereafter, the user 206 may perform one or more gestures to change the settings associated with the selected indicator. For example, after selecting the f-stop indicator, the user 206 may increase the f-stop by performing a swipe gesture to the right. The user 206 may decrease the f-stop by performing a swipe gesture to left. Additionally, after selecting the lens type indicator, the user 206 may select lens with progressively higher zoom by performing swipe gestures to the right. The user 206 may select lens with progressively less zoom (or wider angle) by performing swipe gestures to the left.

In some embodiments, rather than specifically selecting an indicator, the user 206 may use different gestures to determine which lens setting/parameter to change. For example, swiping horizontally with a three fingers on the touchscreen of the computing device may change the f-stop.

Swiping horizontally on the screen with four fingers may cause a change in the lens type. Double tapping on the location of an object on the touchscreen of the computing device may focus the virtual camera 1104 on the object.

In another aspect, the user interface of the computing device 102 may enable the user 206 to select a particular "crop factor" or "aspect ratio" to be applied to the image frames shown to the user 206 to simulate different movie or cinematic formats. In one embodiment, the cropped out area may be completely opaque. In other embodiments, the cropped out area may be semi-translucent such that the portions of the VR environment in the cropped out area can be partially seen. In certain embodiments, the degree of transparency of the cropped out area may be changed by the user 206. For example, the user 206 may indicate a 25%, 50%, or 75% degree of transparency. In this way, a director can understand what parts of the VR environment may be left out in a finally completed item of content.

In some examples, as the user 206 is moving the virtual camera 1104 around the VR environment, he or she may indicate to the computing device 102 to save a "bookmark" of the virtual camera 1104's current location, orientation, and any associated parameters. In effect, the bookmark saves a shot taken from the virtual camera 1104 using specific camera parameters. In some embodiments, the user interface provided by the computing device may additionally enable the user 206 to annotate or include notes for the bookmark. For example, the user 206 can provide an overall annotation or annotations for the bookmark. As another example, the user 206 can select different areas of the bookmarked shot and place separate annotations at those areas. In some embodiments, the user 206 may also attach a rating to the bookmark. The bookmarks may be sorted according to the rating when later accessed as described below.

In one aspect, the generated bookmarks and any annotations may later be used to re-load the VR environment from the perspective of the virtual camera 1104 with the associated parameters by the server 108 and/or content creation system. When re-loaded by the server 108, the virtual camera 1104 is placed at the position and orientation indicated by the bookmark with any associated camera parameters. Thereafter, the user 206 can begin moving and/or interacting with the virtual camera 1104 from the position in the VR environment. Discussion of re-loading the bookmark into the content creation system is discussed below. In some embodiments, any previously generated bookmarks may be presented in a list sorted by rating and/or by most recent modification. In certain embodiments, the bookmarks presented to user 206 may have been created by several different other users across several different VR environments. The user 206 may organize such bookmarks into a playlist in which each shot is present to the user 206 in the order of the playlist.

As should be clear, the computing device 102 may be, for example, a smartphone, tablet, or any other device configured to include sensors or sensing mechanisms (e g, infrared reflective targets). For example, the computing device 102 may be a device that includes one or more buttons and a set of infrared reflective targets. The buttons may allow the computing device 102 to send command signals to the server 108 in order to perform various functions. The infrared reflective targets may allow sensors of the motion capture system to track the position of the computing device 102 at any given time.

In one aspect, the server 108 may map the physical orientation/position of the computing device 102 with a physical orientation/position of a virtual selection element in the VR environment. Such mapping can be performed in any suitable manner. For example, the server 108 may map the initial GPS coordinates, accelerometer information, and other sensor information received from the computing device 102 to an initial virtual position or orientation of the virtual selection element. As another example, the sensors of the motion capture system may determine the initial location of the computing device 102 by detecting the infrared reflective markers on the computing device 102. The initial location may be mapped to an initial virtual position or orientation of the virtual selection element. As will be described below, any change in the initial physical orientation/position of the computing device 102 may cause movement of the virtual selection element in the VR environment.

In one embodiment, the virtual selection element may be represented by one or more visible rays or beams cast or emanating from the position of a virtual camera 1104 of the VR environment. In some instances, the one or more rays may terminate or end once intersecting with or "hitting" the surface of an object in the VR environment. The intersecting object may be considered to be currently "selected" by the representative system. In certain embodiments, the end or terminus of the virtual selection element may be represented by and/or include a target or "bulls-eye." The virtual selection element may also be associated with one or more displayed attributes for the surface with which it currently intersects. The attribute information may include information regarding the material of the surface, the density of the surface, the texture of the surface, the color of the surface, the virtual distance of the surface from the virtual camera 1104 of the VR environment, etc. In some instances, user 206 may interact with the computing device 102 to change the attributes of the surface in real-time or at interactive frame rates. For example, user 206 may interact with the computing device 102 to change the attribute of the intersecting/selected virtual surface from a "wood" material to a "metal" material. Upon changing a surface from a wood material to a metal material, images of the virtual surface displayed to the user 206 may be updated at interactive frames rates (e.g., 30, 60, 90, or 120 frames per second) accordingly to include a silver, shiny surface.

In some instances, the user 206 may interact with the computing device 102 to choose a virtual object to be placed on a selected surface. For example, user 206 may enter into an object placement menu or use predefined hotkeys to select and place a virtual tree or building on a surface currently selected by the virtual selection element. In some instances, the user 206 may move or remove a virtual object from the VR environment. For example, user 206 may select a virtual tree using the virtual section element and move the virtual tree to another location in the VR environment by physically moving the computing device 102 (as described and illustrated herein).

In some instances the virtual objects of the VR environment may move or interact with other objects over time. In one aspect, the movement or interaction of the virtual objects may have been pre-rendered and/or pre-defined such that the virtual objects can be presented in very high fidelity. In other aspects, the movement and/or interactions of the virtual objects may be rendered in real-time.

In some instances, user 206 may move the virtual selection element by physically moving the computing device 102 in the real world environment. As mentioned, the physical orientation of the computing device 102 may be mapped to the orientation of the virtual selection element in the VR environment. Thus, if the computing device 102 moves three feet to the right in the physical world, the virtual selection element may also move three virtual feet to the right in the virtual world. In this way, user 206 can quickly select different objects within the VR environment and determine the attributes of the objects. User 206 can also quickly add, remove, or move objects around the VR environment.

Figure 12A:
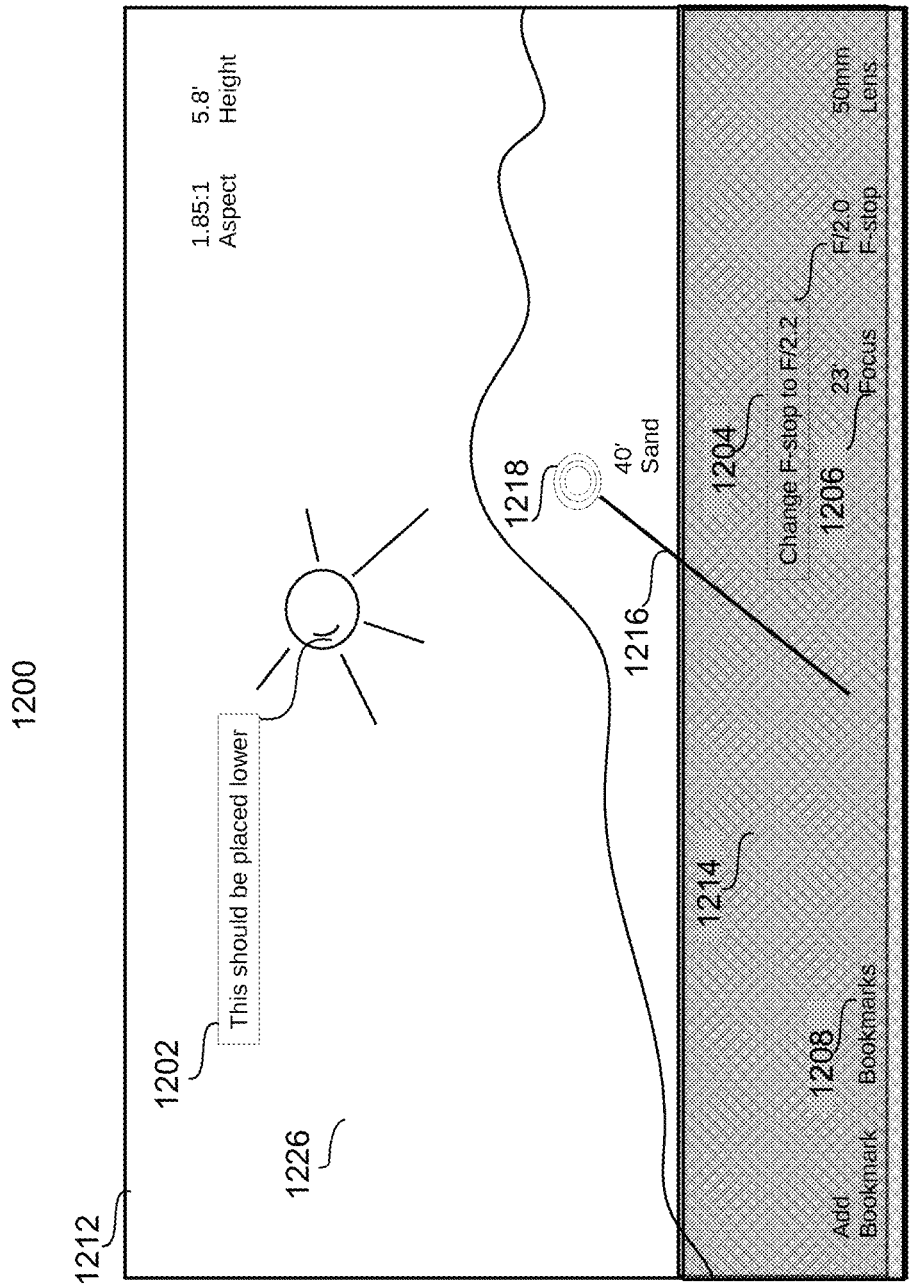
FIG. 12A illustrates an example user interface for generating content based on a VR environment facilitated by the system shown in FIG. 1.

FIG. 12*a* shows an example user interface 1200 showing a view 1212 of VR taken by a virtual camera, such as the virtual camera 1104. The view 1212 can be displayed on an interactive device shown in FIG. 1, such as the computing device 102 or HMD 104. In particular, FIG. 12*a* includes the indicator 1206 showing the current focus distance value. FIG. 12*a* also includes the indicator 1208 with which a user can interact in order to access any previously saved bookmarks. FIG. 12*a* further shows the annotations 1204 and 1202 that are associated with the particular shot. It should also be appreciated that the image frames presented to the user include cropped out areas 1226 and 1214. FIG. 12*a* further shows a virtual selection element 1216. The virtual selection element 116 includes a ray portion that is cast out from the virtual camera 1104 and a target element 1218 indicating the surface with which the virtual selection element 1216 first intersects. In some embodiments, the virtual selection element 1216 may only terminate at a surface that is of a particular type. For example, the virtual selection element 1216 may not end (or be considered to intersect) with surfaces that have a less than a threshold density or are defined as having a gaseous or liquid type. For instance, the virtual selection element 1216 may not end (or be considered to intersect) a virtual cloud since the virtual cloud may not meet a predefined threshold density. Referring again to FIG. 12*a*, the virtual selection element 1216 is further associated with attribute information for a currently selected surface. In particular, the attribute information indicates that the selected surface (the surface of a dune) is 40 feet away and has a "sand" material type.

Figure 12B:
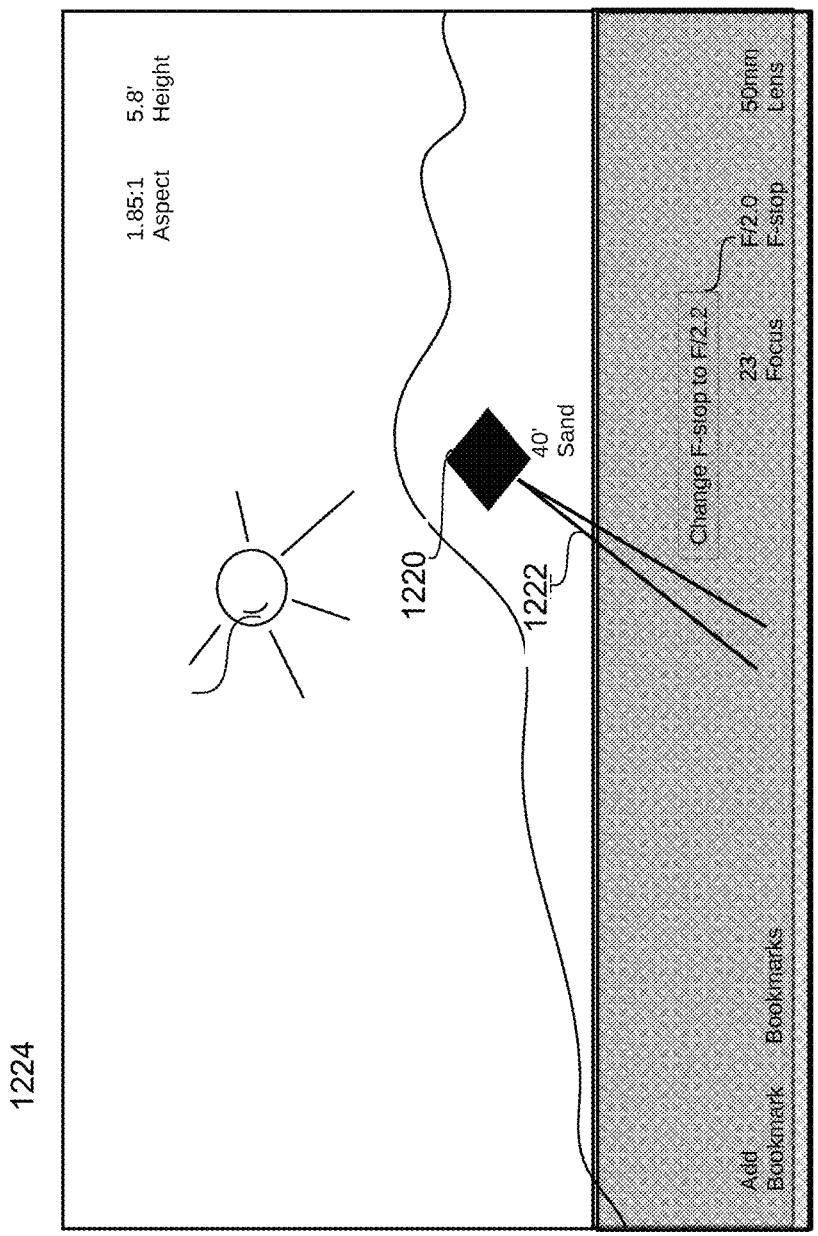
FIG. 12B illustrates another example user interface for generating content based on a VR environment facilitated by the system shown in FIG. 1.

FIG. 12*b* shows an example user interface 1224 similar to that shown in FIG. 12*a*. FIG. 12*b* shows a virtual selection element 1222 with multiple rays. At the end of the rays is an object 1220 that will be placed on the surface that currently intersects with the virtual selection element 1222.

Returning to FIG. 11, in some embodiments, the user can use the computing device 102 to change the scale of the virtual camera 1104. For example, the user can change the scale of the virtual camera 1104 such that the VR environment can appear very large. Put another way, the user can shrink the virtual camera 1104 such that it appears the user is an insect within the VR environment. In this way, the user can examine detailed aspects of the environment. As another example, the user can change the scale of the virtual camera 1104 such that the VR environment appears very small. Put another way, the user can enlarge the virtual camera such that it appears that the user is a giant within the VR environment. In this way, the user can easily examine the entirety of the VR environment. In one embodiment, the user can navigate the VR environment according to or based on the camera's virtual size. For example, "smaller" virtual cameras 1104 may move slower or have smaller "steps" across the virtual environment. "Larger" virtual camera may move faster or have "larger steps" across the same virtual environment.

In another embodiment, the user 206 may use computing device 102 (e.g., smartphone, tablet, device with infrared reflective markers, etc.) to select various objects within the VR environment by pointing the computing device 102 at various points of the projection device(s) displaying the virtual environment. The user 206 may further use the computing device 102 to place various objects within the VR environment.

In one embodiment, the bookmarks created by the user 206 may be exported or otherwise provided to the content creation system. An artist operating the content creation system may select the bookmarks (which may be sorted by rating) in order to load a virtual camera in the VR environment from a position and orientation indicated by the bookmark. The virtual camera 1104 may also be loaded with a lens type, focus, crop-factor, and/or f-stop indicated by the bookmark. In this way, the artist can easily begin processing a scene in order to generate an item of content.

Figure 13:
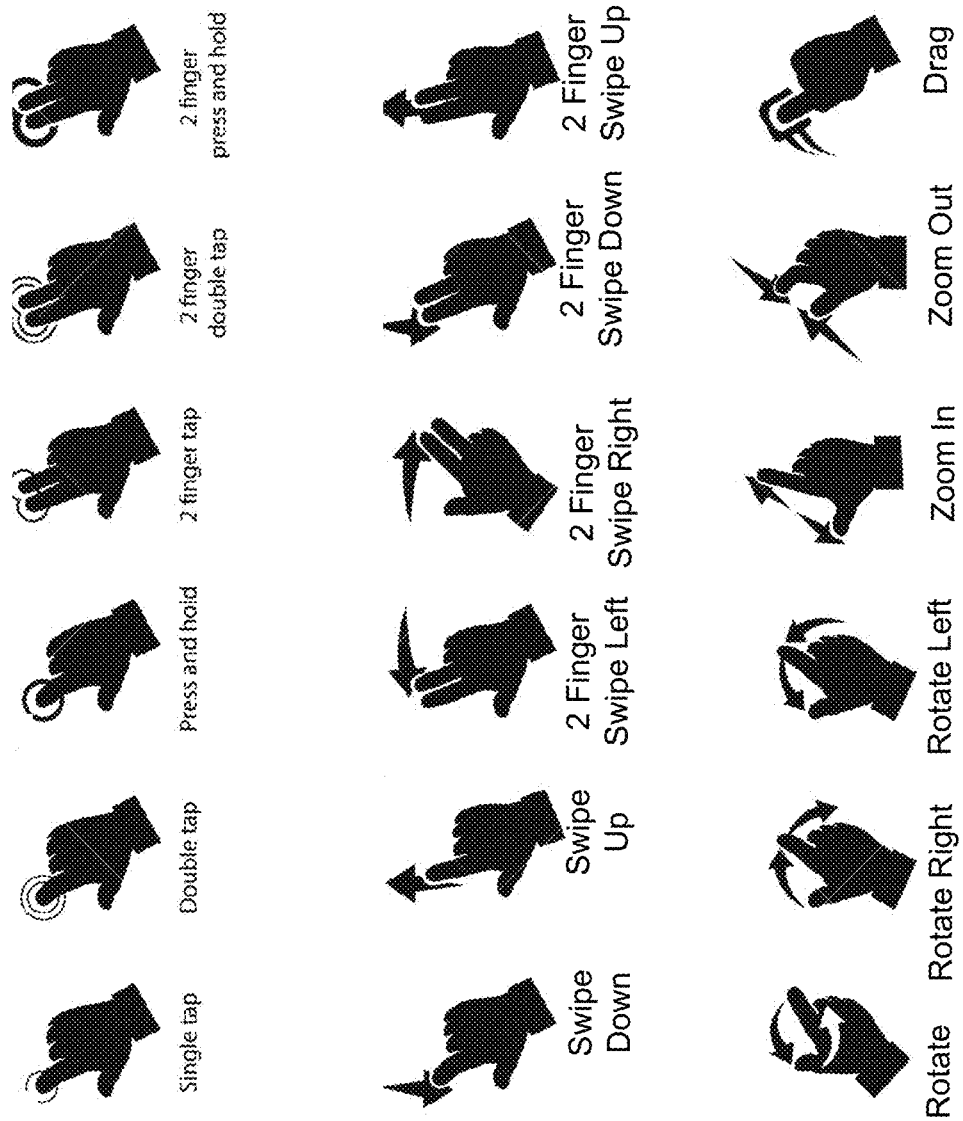
FIG. 13 illustrates some examples of finger gestures provided through a computing device shown in FIG. 2 for controlling the virtual camera and/or any other type of virtual object in a VR environment facilitated by the system shown in FIG. 1.

In one embodiment, the HMD 104 (if it is a pair of VR glasses or goggles, for example), may present a split screen to a user. One side of the screen may display video of the physical environment as captured by a front facing camera associated with the second mobile device. The other side may show the virtual environment. In this way, the user can simultaneously view the virtual environment while being able to also avoid obstacles in the physical environment as the user moves. In another embodiment, a picture-in-picture organization may be used rather than a split screen. For example, the primary screen may display the virtual environment. A smaller secondary screen may be overlaid on the primary screen and show the physical environment FIG. 13 illustrates some examples of finger gestures that may be provided by the user 206 through the computing device 102 for controlling the virtual camera 1104 and/or any other type of virtual objects in the VR environment. For example, without limitation, the user 206 may single tap on the computing device 102 to select the virtual camera 1104, may swipe down/up to move the selected virtual camera down/up accordingly in the VR environment, may use 2 finger swipe up/down to move the selected virtual camera in the VR up/down at a higher rate than the single finger swipe, may perform rotate finger gestures as shown to rotate the virtual camera 1104 in the VR environment, may use press and hold to take a view at the current location of the virtual camera 1104, may user finger tap to call up an interface the same or substantially the same as 1200. It should be understood the examples of finger gestures given in FIG. 13 is merely illustrative. Other examples of finger gestures provided via computing device 102 are contemplated for controlling a virtual object in the VR environment.

Figure 7:
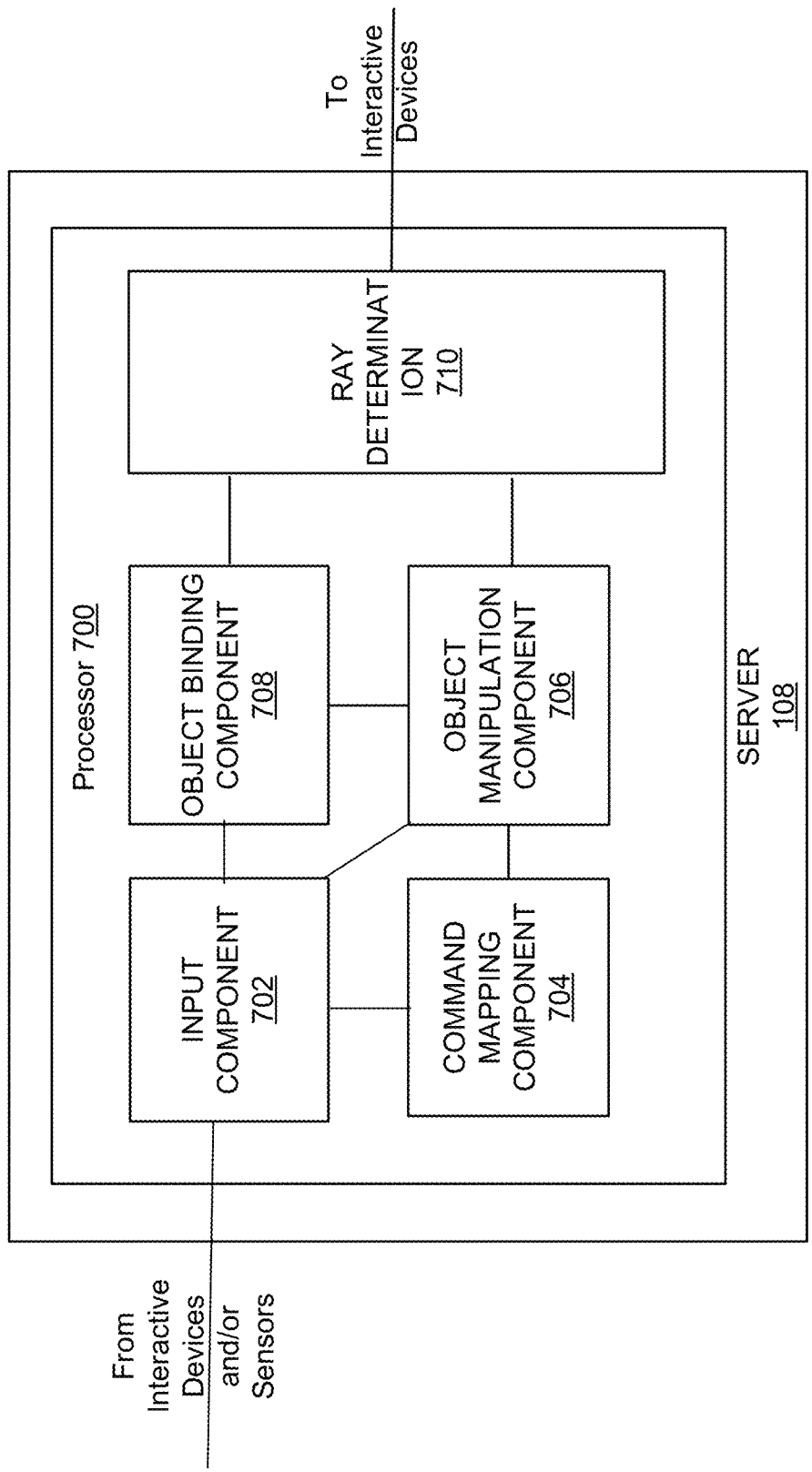
FIG. 7 is a block diagram illustrating an exemplary implementation of the server shown in FIG. 1.

With various examples of system 100 having been described, attention is now directed to FIG. 7, where a block diagram illustrating an exemplary implementation of server 108 is illustrated. It will be described with reference to FIG. 1. As shown, the server 108 may comprise one or more of a processor 700. The processor 700 may comprise a input component 702, a command mapping component 704, an object binding component 706, an object manipulation component 708, a ray determination component 710, and/or any other components. The input component 702 may be configured to receive inputs provided through the interactive devices shown in FIG. 1, such as the computing device 102, the HMD 104, the display device 106, and/or the sensors 202. For example, the input component 702 can receive user inputs provided through the touch sensitive surface associated with the computing device 102. The input component 702 can receive sensor inputs from the sensors 206. The input received by the input component 702 can include inputs indicating position and/or orientation information regarding the computing device 102. In some examples, after receiving the inputs, the user input component 702 may translate the inputs. For example, in some embodiments, inputs received by the user input component 702 can be encoded signals. In those embodiments, the input component 702 can translate the received inputs according to one or more tables configured into user input component 702.

The command mapping component 704 can be configured to map the inputs received by the input component 702 to corresponding control commands according to one or more mapping rules configured into the command mapping component 704. For example, the finger gesture inputs shown in FIG. 3 can be mapped to a control command to call up a menu as shown in FIG. 3. As another example, without limitation, the user inputs received by the input component 702 can be a swiping gesture for selecting a desired object in the menu for binding to the computing device 102. In that example, the command mapping component 704 can map such user inputs to a "select" command for selecting the desired object for the binding. As another example, the command mapping component 704 can generate an object manipulation command to manipulate one or more objects bound to the computing device 102 in response to position and/or orientation information regarding the computing device 102 being received by the input component 702 via the sensors 202.

The object binding component 708 can be configured to bind one or more virtual objects in the VR to the computing device 102. The operations performed by the binding component 708 can include effectuating an association between a virtual object, such as the virtual object 404, and the computing device 102; stored such an association in storage associated with the server 108; retrieving such an association in response to a user input from the input component 702, and/or any other operations.

The object manipulation component 706 can be configured to determine movement, position, and/or orientation manipulation for an virtual object in the VR environment. The determination by the object manipulation component 706 can be based on the inputs received by the input component 702. In some examples, the object manipulation component 706 can be configured to determine movement and/or orientation change for the computing device 102 based on the inputs received by the input component 702. For example, the object manipulation component 706 can be configured to keep track of the position of the computing device 102 within the area 204 and determine the movement and/or orientation change based on the position differences at two different time points for the computing device 102. Based on the movement and/or the orientation change of the computing device 102 within the area 204, the object manipulation component can determine a displacement of an virtual object bound to the computing device 102, such as the virtual object 404, in the VR environment. The determined displacement can include a translational and/or a rotational movement for the virtual object bound to the computing device 102.

The ray determination component 710 can be configured to determine a ray cast by a virtual object bound to the computing device 102. The ray determination by the ray determination component 710 can include determining a direction, a path, an angle, a travel distance, an intensity of the ray, one or more targets hit the ray, one or more damages caused by the ray in the VR environment, and/or any other aspects regarding the ray cast by the virtual object. The ray determination by the ray determination component 710 can be triggered by the object manipulation determined by the object manipulation component 706. For example, in response to a movement of the virtual object in the VR environment as determined by the object manipulation component 706, the ray determination component 710 can determine various aspects about the ray cast by that virtual object as described and illustrated herein.

Figure 8:
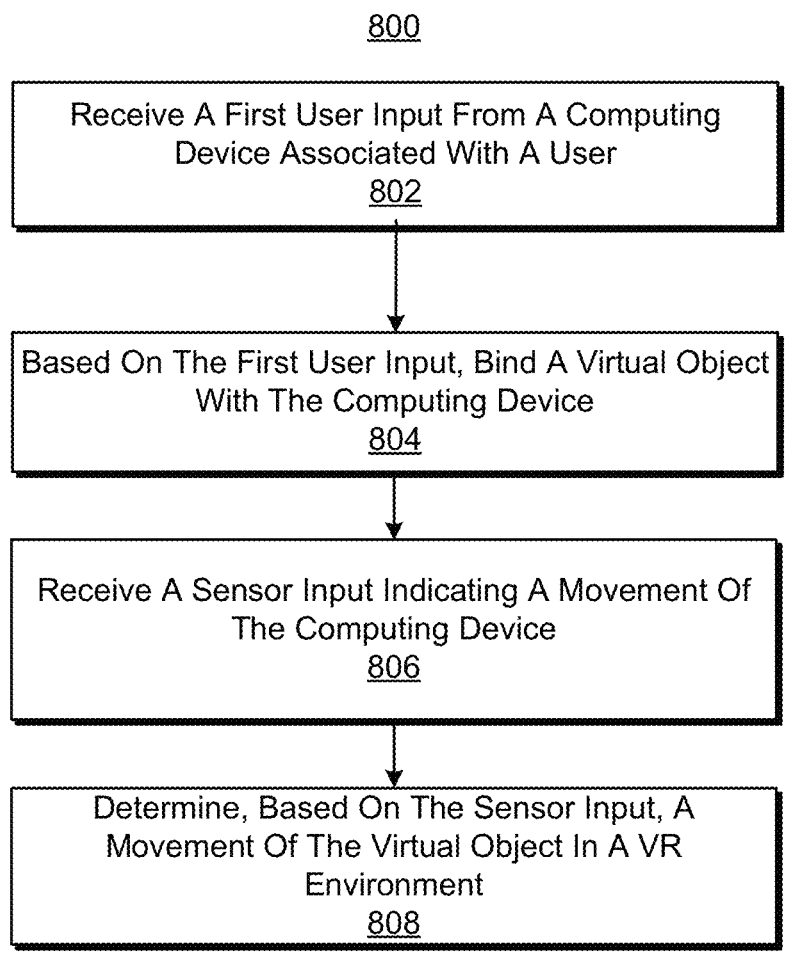
FIG. 8 illustrates an example of a process for manipulating a virtual object in a VR environment based on inputs from a computing device associated with a user.

FIG. 8 illustrates an example of a process 800 for manipulating a virtual object in a VR environment based on inputs from a computing device associated with a user. Process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. In some aspects, the process 800 may be performed by one or more of a server, such as server 108 described and illustrated herein.

At 802, a first user input can be received from a computing device associated with the user. The computing device can be associated with a touch sensitive surface and the first user input can be provided by the user via the touch sensitive surface. In some examples, the first input can include one or more of a finger gesture, such as a single tap, provided by the user via the touch sensitive surface associated with the computing device. In some examples, 808 may be performed by a input component the same as or substantially similar to the input component 702 described and illustrated herein.

At 804, a virtual object can be bound to the computing device based on the first user input. For example, based on the first user input, a menu of one or more selectable virtual objects for binding can be presented in a view of VR displayed to the user. Through such a menu, the user can be enabled to select a virtual object or virtual objects for binding to the computing device. However, this is not intended to be limiting. Other examples of enabling a user to bind a virtual object to the computing device 102 associated with the user at 804 are contemplated. For example, without limitation, an association between an virtual object and a user input may be predetermined and stored for such binding. For instance, the virtual object can be a virtual camera, and the user input can be a double tap on the touch sensitive surface associated with the computing device 102. In that instance, the user can double tap the touch sensitive surface to bind the virtual camera to the computing device 102 such that the user can subsequently manipulate the virtual camera using the computing device 102 in a manner consistent with those described and illustrated herein. As another example, without limitation, the user input can activate a binding mode such that once the user input is received by the server 108, one or more virtual objects, virtual characters, terrains, and/or any other entities in the frustum of the view 302 can be selected by the user for the binding. In some examples, 804 may be performed by an object binding component the same as or substantially similar to the object binding component 708 described and illustrated herein.

At 806, a sensor input can be received. The sensor input received by at 806 can include inputs indicating position and/or orientation information regarding the computing device 102 as described herein. In some examples, 806 may be performed by a input component the same as or substantially similar to the input component 702 described and illustrated herein.

At 808, a movement of the virtual object, bound to the computing device at 804, in the VR environment can be determined. The determination by 808 can include determining movement and/or orientation change for the computing device 102 based on the sensor input received. Based on the movement and/or the orientation change of the computing device 102 within the area 204, a displacement of the virtual object in the VR environment can be determined at 808. The determined displacement can include a translational and/or a rotational movement for the virtual object in the VR environment. In some examples, 808 can be performed by an object manipulation component the same as or substantially similar to the object manipulation component 706 described and illustrated herein.

As an example, without limitation, a number of virtual objects in the VR environment can be manipulated in accordance with the disclosure. For instance, the virtual objects can be moved by one or more computing devices 102 bound to the virtual objects to create a scene for rendering. Information for rendering the scene can be retrieved. Such information can include the arrangement of the virtual objects in the scene, displacements of these virtual objects in the VR environment as results of manipulation through the computing device(s) 102, one or more lens associated with the scene, the specific types of those lens, arrangement of one or more virtual cameras (e.g., position, angle, orientation, etc.), and/or any other aspects for rendering the scene. Such information can be processed by system 100 or any other system having rendering capability to render the scene for use, for example, in an animation.

Figure 9:
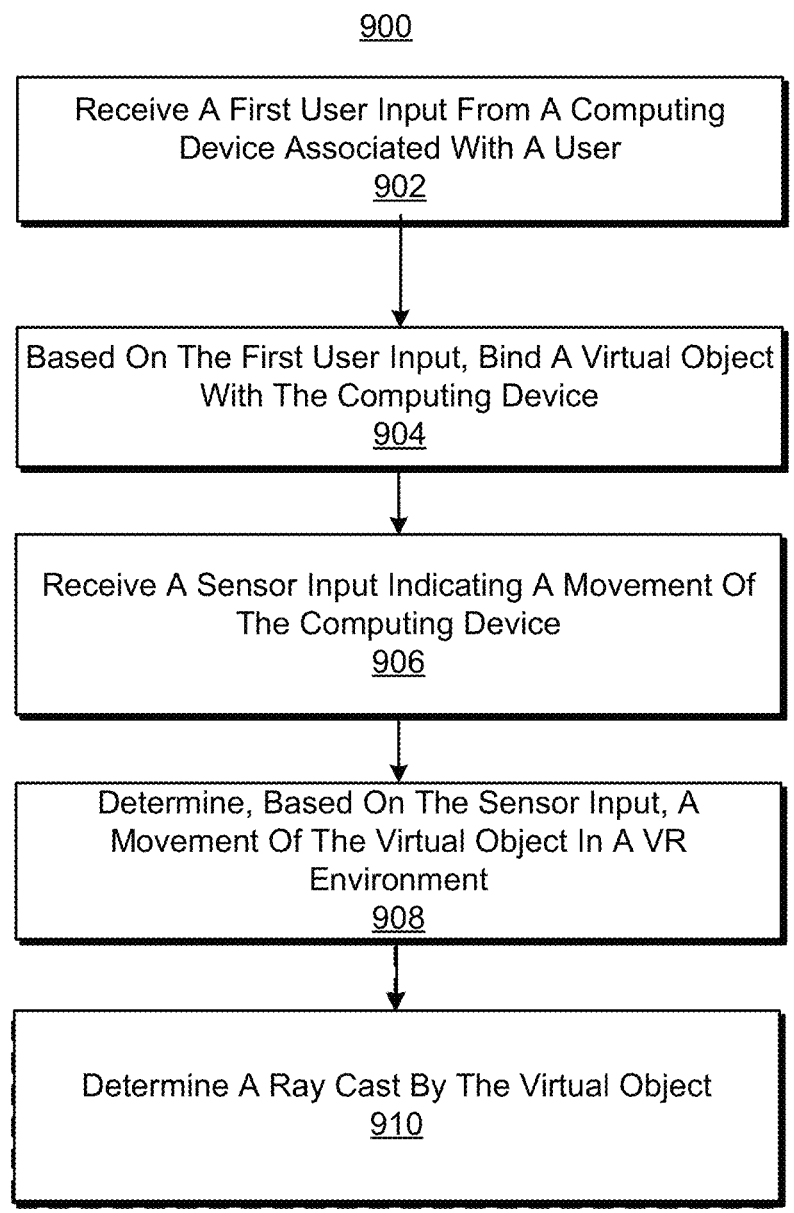
FIG. 9 illustrates another example of a process for manipulating a virtual object in a VR environment based on inputs from a computing device associated with a user.

FIG. 9 illustrates another example of a process 900 for manipulating a virtual object in a VR environment based on inputs from a computing device associated with a user. Process 900 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. In some aspects, the process 900 may be performed by one or more of a server, such as server 108 described and illustrated herein.

At 902, a first user input can be received from a computing device associated with the user. The computing device can be associated with a touch sensitive surface and the first user input can be provided by the user via the touch sensitive surface. In some examples, the first input can include one or more of a finger gesture, such as a single tap, provided by the user via the touch sensitive surface associated with the computing device. In some examples, 909 may be performed by a input component the same as or substantially similar to the input component 702 described and illustrated herein.

At 904, a virtual object can be bound to the computing device based on the first user input. For example, based on the first user input, a menu of one or more selectable virtual objects for binding can be presented in a view of VR displayed to the user. Through such a menu, the user can be enabled to select a virtual object or virtual objects for binding to the computing device. However, this is not intended to be limiting. Other examples of enabling a user to bind a virtual object to the computing device 102 associated with the user at 804 are contemplated. For example, without limitation, an association between an virtual object and a user input may be predetermined and stored for such binding. For instance, the virtual object can be a virtual camera, and the user input can be a double tap on the touch sensitive surface associated with the computing device 102. In that instance, the user can double tap the touch sensitive surface to bind the virtual camera to the computing device 102 such that the user can subsequently manipulate the virtual camera using the computing device 102 in a manner consistent with those described and illustrated herein. As another example, without limitation, the user input can activate a binding mode such that once the user input is received by the server 108, one or more virtual objects, virtual characters, terrains, and/or any other entities in the frustum of the view 302 can be selected by the user for the binding. In some examples, 904 may be performed by an object binding component the same as or substantially similar to the object binding component 709 described and illustrated herein.

At 906, a sensor input can be received. The sensor input received by at 906 can include inputs indicating position and/or orientation information regarding the computing device 102 as described herein. In some examples, 906 may be performed by a input component the same as or substantially similar to the input component 702 described and illustrated herein.

At 908, a movement of the virtual object, bound to the computing device at 904, in the VR environment can be determined. The determination by 909 can include determining movement and/or orientation change for the computing device 102 based on the sensor input received. Based on the movement and/or the orientation change of the computing device 102 within the area 204, a displacement of the virtual object in the VR environment can be determined at 909. The determined displacement can include a translational and/or a rotational movement for the virtual object in the VR environment. In some examples, 908 can be performed by an object manipulation component the same as or substantially similar to the object manipulation component 906 described and illustrated herein.

At 910, a ray cast by the virtual object can be determined. The determination at 910 can be based on the movement of virtual object in the VR environment determined at 908 such that the determined movement of the virtual object can change one or more aspects about the ray cast by the virtual object into the VR environment. For example, a distance between the virtual object and one or more targets hit the ray within the VR environment can be determined, various attributes regarding these targets can be determined, a damage incurred by the ray to those targets can be determined, an angle between the ray and those targets can be determined, and/or any other aspects regarding those target object. In some examples, 910 can be performed by a ray determination component the same as or substantially similar to the ray determination component 710 described and illustrated herein.

As an example, without limitation, a number of virtual objects in the VR environment can be manipulated in accordance with the disclosure. For instance, the virtual objects can be moved by one or more computing devices 102 bound to the virtual objects to create a scene for rendering. Information regarding the objects can be obtained by casting rays (e.g., using virtual selection element described and illustrated herein). Such information can include the location of the virtual objects in the scene, various attributes (e.g., material, color, opacity, etc.) regarding virtual objects in the VR environment, focus distance from these objects to an origin of the ray(s), and/or any other aspects regarding the objects for rendering the scene. Such information can be processed by system 100 or any other system having rendering capability to render the scene for use, for example, in an animation.

Figure 10:
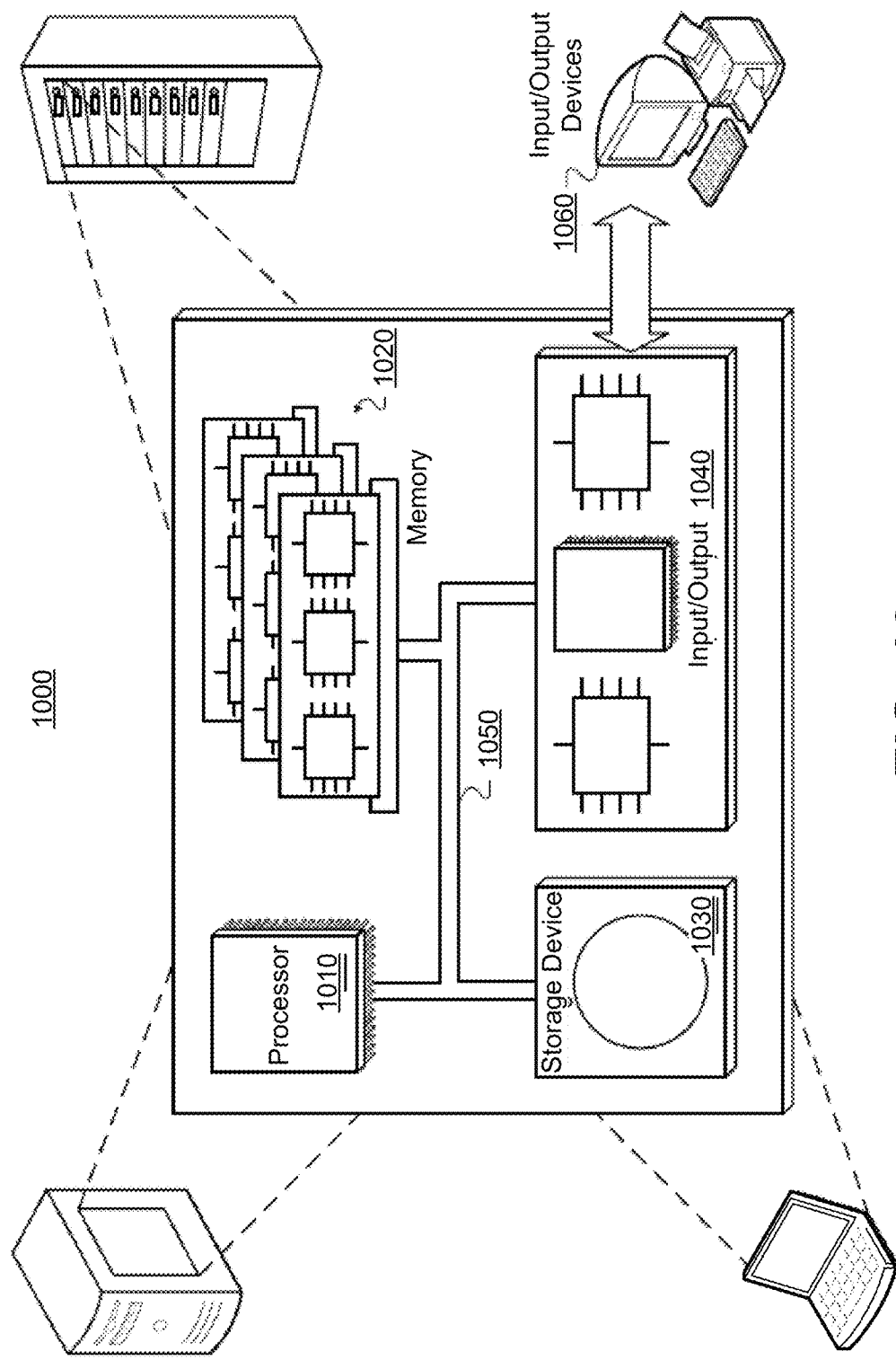
FIG. 10 is a schematic diagram is shown of an example of a computer system.

Referring to FIG. 10, a schematic diagram is shown of an example of a computer system 1000. This system is exemplary only and one having skill in the art will recognize that variations and modifications are possible. The system 1000 can be used for the operations described above. For example, the computer systems shown in FIG. 10 may be used to implement any or all of the initialization (e.g., face annotation, skull fitting, constraint creation) and stabilization (e.g., skin energy or error determination, nose energy or error determination) techniques and routines described herein.

The system 1000 includes a processor 1010, a memory 1020, a storage device 1030, and an input/output interface 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to provide graphical information via input/output interface 1040 for display on a user interface of one or more input/output device 1060.

The memory 1020 stores information within the system 1000 and may be associated with various characteristics and implementations. For example, the memory 1020 may include various types of computer-readable medium such as volatile memory, a non-volatile memory and other types of memory technology, individually or in combination.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1060 provides input/output operations for the system 1000. In one implementation, the input/output device 1060 includes a keyboard and/or pointing device. In another implementation, the input/output device 1060 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-12 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method for facilitating a user to manipulate a virtual reality (VR) environment presented to the user through a head mount display device, the method comprising:

presenting multiple virtual objects in the VR environment through the head mount display device, wherein the multiple virtual objects include a first object and a second object;

indicating, through the display device, that the multiple virtual objects are controllable by a computing device associated with the user in the VR environment, wherein the computing device is separate and distinct from the head mount display device;

receiving, by a server, from the computing device associated with the user, a first user input, the first user input being provided by the user via a touch sensitive surface associated with the computing device, wherein the first user input indicates a selection of a first virtual object from the multiple virtual objects in a menu;

after the first user input having been received, binding, by the server, the computing device to the first virtual object in the VR environment, wherein the first virtual object is capable of casting a ray in a direction into the VR environment;

obtaining, by the server, first movement information indicating a movement of the computing device;

based on the first movement information, determining, by the server, a new position of the first virtual object in the VR environment;

determining, by the server, the ray cast by the first virtual object into the VR environment at the new position of the first virtual object in the VR environment;

determining, by the server, a target virtual object in the VR environment hit by the ray cast by the first virtual object at the new position;

presenting, by the server, object information regarding the target virtual object on the display device to the user in response to the target virtual object having been hit by the cast by the first virtual object;

receiving, by the server, from the computing device associated with the user, a second user input, the second user input being provided by the user via a touch sensitive surface associated with the computing device, wherein the second user input indicates a selection of a second virtual object from the multiple virtual objects in the menu; and after the second user input having been received, binding, by the server, the computing device to the second virtual object in the VR environment.

2. The computer-implemented method of claim 1, wherein the first movement information includes information indicating a translational and/or a rotational movement of the computing device.

3. The computer-implemented method of claim 1, wherein the object information regarding the target virtual object includes information indicating one or more attributes of the target virtual object.

4. The computer-implemented method of claim 3, wherein the one or more attributes of the target virtual object includes at least one of a material, a density, a texture and a color of a surface of the target virtual object, and a distance between the target virtual object and the first virtual object in the VR environment.

5. The computer-implemented method of claim 1, further comprising determining one or more damages incurred by the ray in the VR environment at the new position.

6. The computer-implemented method of claim 1, further comprising determining a distance traveled by the ray in the VR environment at the new position.

7. The computer-implemented method of claim 1, further comprising determining ray information regarding the ray for presentation to the user in a view of the VR environment.

8. The computer-implemented method of claim 1, wherein the menu indicates each of the multiple virtual objects are selectable by the user for binding the first virtual object to the computing device associated with the user such that after the multiple virtual objects are selected and bound to the computing device, the user is enabled to manipulate a movement of the first virtual object within the VR environment by providing inputs through the computing device associated with the user.

9. The computer-implemented method of claim 1, wherein the first virtual object includes a virtual camera, and wherein the method further comprises determining a view of the VR for display to the user based on the new position of the virtual camera.

10. The computer-implemented method of claim 1, further comprising enabling the user to select one or more virtual objects appearing in a view of the VR for binding to the computer device in response to the first user input being received.

11. A server for facilitating a user to manipulate a virtual reality (VR) environment presented to the user through a head mount display device, the server comprising:
a processor configured to:
present multiple virtual objects in the VR environment through the head mount display device, wherein the multiple virtual objects include a first object and a second object;
indicate, through the display device, that the multiple virtual objects are controllable by a computing device associated with the user in the VR environment, wherein the computing device is separate and distinct from the head mount display device;
receive from a computing device associated with the user, a first user input, the first user input being provided by the user via a touch sensitive surface associated with the computing device, wherein the first user input indicates a selection of the first object from the multiple virtual objects in a menu, and wherein the computing device is separate and distinct from the display device;
after the first user input having been received, bind, by the server, the computing device to a first virtual object in the VR environment, wherein the first virtual object is capable of casting a ray in a direction into the VR environment;
obtain first movement information indicating a movement of the computing device;
based on the first movement information, determine a new position of the first virtual object in the VR environment;
determine, by the server, the ray cast by the first virtual object into the VR environment at the new position of the first virtual object in the VR environment;
determine, by the server, a target virtual object in the VR environment hit by the ray cast by the first virtual object at the new position;
present, by the server, object information regarding the target virtual object on the display device to the user in response to the target virtual object having been hit by the cast by the first virtual object;
receive, by the server, from the computing device associated with the user, a second user input, the second user input being provided by the user via a touch sensitive surface associated with the computing device, wherein the second user input indicates a selection of a second virtual object from the multiple virtual objects in the menu; and
after the second user input having been received, bind, by the server, the computing device to the second virtual object in the VR environment.

12. The server of claim 11, wherein the first movement information includes information indicating a translational and/or a rotational movement of the computing device.

13. The server of claim 11, wherein the object information regarding the target virtual object includes information indicating one or more attributes of the target virtual object.

14. The server of claim 13, wherein the one or more attributes of the target virtual object includes at least one of a material, a density, a texture and a color of a surface of the target virtual object, and a distance between the target virtual object and the first virtual object in the VR environment.

15. The server of claim 11, wherein the processor is further configured to determine one or more damages incurred by the ray in the VR environment at the new position.

16. The server of claim 11, wherein processor is further configured to determine a distance traveled by the ray in the VR environment at the new position.

17. The server of claim 11, wherein the processor is further configured to determine ray information regarding the ray for presentation to the user in a view of the VR environment.

18. The server of claim 11, wherein the menu indicates each of the multiple virtual objects are selectable by the user for binding the first virtual object to the computing device associated with the user such that after the multiple virtual objects is selected and bound to the computing device, the user is enabled to manipulate a movement of the first virtual object within the VR environment by providing inputs through the computing device associated with the user.

19. The server of claim 11, wherein the first virtual object includes a virtual camera, and wherein the processor is further configured to determine a view of the VR for display to the user based on the new position of the virtual camera.

20. The server of claim 11, wherein the processor is further configured to enable the user to select one or more virtual objects appearing in a view of the VR for binding to the computer device in response to the first user input being received.

* * * * *